US012521630B2

(12) United States Patent
Fan et al.

(10) Patent No.: US 12,521,630 B2
(45) Date of Patent: Jan. 13, 2026

(54) METHODS, TERMINAL DEVICE, AND STORAGE MEDIUM FOR PICTURE DISPLAY

(71) Applicant: TENCENT TECHNOLOGY (SHENZHEN) COMPANY LIMITED, Shenzhen (CN)

(72) Inventors: Sidan Fan, Shenzhen (CN); Ruihan Yang, Shenzhen (CN); Kongwei Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 265 days.

(21) Appl. No.: 18/340,676

(22) Filed: Jun. 23, 2023

(65) Prior Publication Data

US 2023/0330532 A1 Oct. 19, 2023

Related U.S. Application Data

(63) Continuation of application No. PCT/CN2022/127196, filed on Oct. 25, 2022.

(30) Foreign Application Priority Data

Jan. 4, 2022 (CN) ......................... 202210003178.6

(51) Int. Cl.
*A63F 13/5258* (2014.01)
*A63F 13/5372* (2014.01)
*G06T 7/70* (2017.01)

(52) U.S. Cl.
CPC ...... *A63F 13/5258* (2014.09); *A63F 13/5372* (2014.09); *G06T 7/70* (2017.01)

(58) Field of Classification Search
CPC ..... A63F 13/5258; A63F 13/5372; G06T 7/70
See application file for complete search history.

(56) References Cited

U.S. PATENT DOCUMENTS

2004/0209684 A1* 10/2004 Hisano .................... A63F 13/10 463/32
2004/0219980 A1* 11/2004 Bassett ................... A63F 13/10 463/6

(Continued)

FOREIGN PATENT DOCUMENTS

CN 1696973 A 11/2005
CN 106600668 A 4/2017

(Continued)

OTHER PUBLICATIONS

The Japan Patent Office (JPO) Notice of Reasons for Refusal for Application No. 2024-514684 Jan. 14, 2025 14 Pages (including translation).

(Continued)

*Primary Examiner* — Malina D. Blaise
(74) *Attorney, Agent, or Firm* — Anova Law Group, PLLC

(57) ABSTRACT

A picture display method includes: displaying a first picture frame; determining a target position of the virtual follower object according to a target position of a self character and a target position of a first locked character; determining a target position and target orientation of the virtual camera according to the target position of the virtual follower object; performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying the (Continued)

second picture frame based on the single-frame target position and single-frame target orientation of the virtual camera in the second picture frame.

20 Claims, 12 Drawing Sheets

(56) References Cited

U.S. PATENT DOCUMENTS

| | | | | |
|---|---|---|---|---|
| 2005/0266921 | A1 | 12/2005 | Hayashida et al. | |
| 2011/0244958 | A1 | 10/2011 | Nimura et al. | |
| 2014/0267221 | A1 | 9/2014 | Paquet et al. | |
| 2015/0355814 | A1 | 12/2015 | Miyamoto | |
| 2017/0001111 | A1 * | 1/2017 | Willette | A63F 13/49 |
| 2019/0217202 | A1 | 7/2019 | Komori et al. | |
| 2019/0374855 | A1 | 12/2019 | Johnston et al. | |
| 2020/0324202 | A1 | 10/2020 | Ohno et al. | |
| 2021/0402298 | A1 * | 12/2021 | Zhou | A63F 13/5255 |
| 2022/0047946 | A1 | 2/2022 | Hu et al. | |
| 2022/0054939 | A1 | 2/2022 | Wei et al. | |
| 2022/0210387 | A1 * | 6/2022 | Ueda | G06T 1/0007 |
| 2022/0212104 | A1 | 7/2022 | Yang | |
| 2022/0249949 | A1 | 8/2022 | Zhou et al. | |
| 2024/0115944 | A1 * | 4/2024 | Wei | A63F 13/35 |

FOREIGN PATENT DOCUMENTS

| | | | |
|---|---|---|---|
| CN | 107358656 | A | 11/2017 |
| CN | 111282266 | A | 6/2020 |
| CN | 111420402 | A | 7/2020 |
| CN | 111467802 | A | 7/2020 |
| CN | 112791405 | A | 5/2021 |
| CN | 114307145 | A | 4/2022 |
| JP | 2003079954 | A | 3/2003 |
| JP | 2004334850 | A | 11/2004 |
| JP | 2005319220 | A | 11/2005 |
| JP | 2011215918 | A | 10/2011 |
| JP | 2015230682 | A | 12/2015 |
| JP | 2017200494 | A | 11/2017 |
| JP | 2018094017 | A | 6/2018 |
| JP | 2018110659 | A | 7/2018 |
| JP | 2019122496 | A | 7/2019 |
| JP | 2019126380 | A | 8/2019 |
| JP | 2019217269 | A | 12/2019 |
| JP | 2020089492 | A | 6/2020 |
| JP | 2020110430 | A | 7/2020 |
| WO | 2021184785 | A1 | 9/2021 |
| WO | 2021244243 | A1 | 12/2021 |
| WO | 2021258994 | A1 | 12/2021 |

OTHER PUBLICATIONS

The World Intellectual Property Organization (WIPO) International Search Report for PCT/CN2022/127196 Jan. 11, 2023 13 Pages (including translation).

The Japan Patent Office (JPO) Notice of Reasons for Refusal for Application No. 2024-514684 Jun. 17, 2025 9 Pages (including translation).

Koji Ohno, “Technology to make 3D games interesting”, ISBN: 978-4-7973-5736-3, Jun. 4, 2015, pp. 682-685.

* cited by examiner

1310 In a non-character-locked state, update the position of the virtual follower object in an interpolation manner by taking the self character as a follow target, to obtain a single-frame target position of the virtual follower object in a fifth picture frame

↓

1320 Determine a single-frame target position of the virtual camera in the fifth picture frame according to the single-frame target position of the virtual follower object in the fifth picture frame

↓

1330 Determine, when no visual field adjustment operation performed on the self character is received, the actual orientation of the virtual camera in the first picture frame as a single-frame target orientation of the virtual camera in the fifth picture frame

↓

1340 Adjust, when a visual field adjustment operation performed on the self character is received, the actual orientation of the virtual camera in the first picture frame according to the visual field adjustment operation, to obtain a single-frame target orientation of the virtual camera in the fifth picture frame

↓

1350 Generate and display the fifth picture frame based on the single-frame target position and single-frame target orientation of the virtual camera in the fifth picture frame

FIG. 13

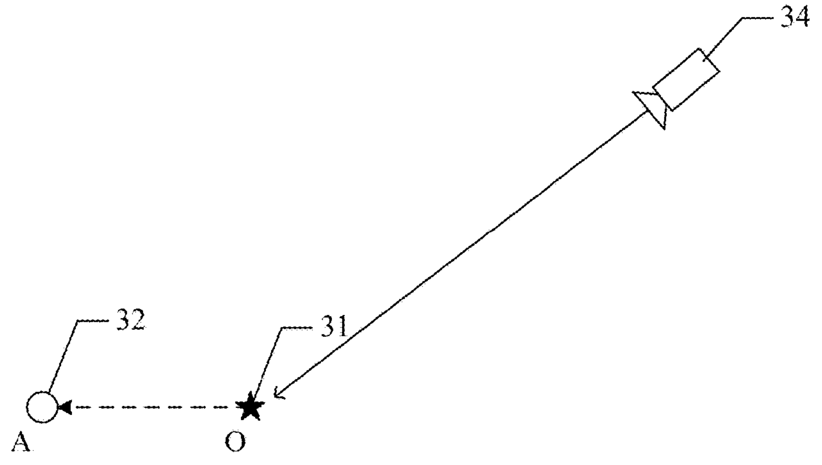

FIG. 14

METHODS, TERMINAL DEVICE, AND STORAGE MEDIUM FOR PICTURE DISPLAY

CROSS-REFERENCES TO RELATED APPLICATIONS

This application is a continuation application of PCT Patent Application No. PCT/CN2022/127196, filed on Oct. 25, 2022, which claims priority to Chinese Patent Application No. 202210003178.6, filed on Jan. 4, 2022, all of which is incorporated herein by reference in their entirety.

FIELD OF THE TECHNOLOGY

Embodiments of the present disclosure relate to the field of computer and Internet technologies, and in particular, to picture display method, terminal device, storage medium, and program product.

BACKGROUND OF THE DISCLOSURE

At present, game applications often provide a three-dimensional virtual environment where users can control virtual characters to perform various operations, providing users with a more realistic game environment.

If a user locks a target virtual character, i.e., a "locked character", in a three-dimensional virtual environment, the game application will control a virtual camera to observe the locked character by using a "self character," a virtual character controlled by the user, as a visual focus, and present pictures captured by the virtual camera to the user. This, however, may easily cause the self character to block the locked character, which affects display effect of the pictures.

SUMMARY

According to one aspect of the present disclosure, a picture display method is provided. The method is performed by a terminal device and includes: displaying a first picture frame that is obtained by using a virtual camera to capture a three-dimensional virtual environment using a virtual follower object in the three-dimensional virtual environment as a visual focus; determining a target position of the virtual follower object according to a target position of a self character and a target position of a first locked character, the first locked character being a locked target corresponding to the self character in a character-locked state; determining a target position and target orientation of the virtual camera according to the target position of the virtual follower object, a distance between the target position of the virtual camera and the target position of the virtual follower object being shorter than a distance between the target position of the virtual camera and the target position of the first locked character; performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying the second picture frame based on the single-frame target position and single-frame target orientation of the virtual camera in the second picture frame.

According to another aspect of the present disclosure, a terminal device is provided and includes a processor and a memory, the memory storing a computer program, and the computer program being loaded and executed by the processor to implement a picture display method. The method includes: displaying a first picture frame that is obtained by using a virtual camera to capture a three-dimensional virtual environment using a virtual follower object in the three-dimensional virtual environment as a visual focus; determining a target position of the virtual follower object according to a target position of a self character and a target position of a first locked character, the first locked character being a locked target corresponding to the self character in a character-locked state; determining a target position and target orientation of the virtual camera according to the target position of the virtual follower object, a distance between the target position of the virtual camera and the target position of the virtual follower object being shorter than a distance between the target position of the virtual camera and the target position of the first locked character; performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying the second picture frame based on the single-frame target position and single-frame target orientation of the virtual camera in the second picture frame.

According to another aspect of the present disclosure, a non-transitory computer-readable storage medium is provided for storing a computer program, the computer program being loaded and executed by a processor to implement a picture display method. The method includes: displaying a first picture frame that is obtained by using a virtual camera to capture a three-dimensional virtual environment using a virtual follower object in the three-dimensional virtual environment as a visual focus; determining a target position of the virtual follower object according to a target position of a self character and a target position of a first locked character, the first locked character being a locked target corresponding to the self character in a character-locked state; determining a target position and target orientation of the virtual camera according to the target position of the virtual follower object, a distance between the target position of the virtual camera and the target position of the virtual follower object being shorter than a distance between the target position of the virtual camera and the target position of the first locked character; performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying the second picture frame based on the single-frame target position and single-frame target orientation of the virtual camera in the second picture frame.

The technical solutions provided in the embodiments of the present disclosure may include the following beneficial effects.

A virtual follower object in a three-dimensional virtual environment is used as a visual focus of a virtual camera. In a character-locked state, position information of the virtual follower object is determined based on position information of a self character and position information of a locked state, and a position and orientation of the virtual camera are updated based on the position information of the virtual follower object. During determination of the position information of the virtual follower object, both the position information of the self character and the position information of the locked character are taken into account, which avoids the locked character from being blocked by the self character, so that the determined position information of the virtual follower object is more reasonable and accurate, thus ensuring that in a picture captured by the virtual camera taking the virtual follower object as the visual focus, the self character and the locked character can be presented to a user in a more reasonable and clearer way, which improves the camera motion reasonability of the virtual camera in the character-locked state, and thus improves the display effect of a picture.

In addition, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera in the character-locked state.

BRIEF DESCRIPTION OF THE DRAWINGS

FIG. 13 is a flowchart of an update process of a virtual camera in a non-character-locked state according to an embodiment of the present disclosure.

FIG. 14 is a schematic diagram of an update process of a virtual camera in a non-character-locked state according to an embodiment of the present disclosure.

DESCRIPTION OF EMBODIMENTS

Reference will now be made in detail to exemplary embodiments of the disclosure, which are illustrated in the accompanying drawings. Wherever possible, the same reference numbers will be used throughout the drawings to refer to the same or like parts.

1. Virtual Environment

Virtual environment refers to an environment displayed (or provided) when a client of an application program (such as a game application) is run on a terminal device (also referred to as a terminal). The virtual environment refers to an environment created for virtual objects to engage in activities (such as game competitions and task execution). For example, the virtual environment can be a virtual house, a virtual island, a virtual map, and the like. The virtual environment can be a simulation of the real world, a semi-simulated and semi-fictional environment, or a purely fictional environment. In the embodiments of the present disclosure, the virtual environment is three-dimensional, which is a space composed of three dimensions: length, width, and height. Therefore, it can be referred to as a "three-dimensional virtual environment".

2. Virtual Character

Virtual character refers to a character controlled by a user account in an application. A game application is taken as an example. Virtual characters refer to game characters controlled by a user account in the game application. The virtual characters can be in the form of person, animal, cartoon, or any others without limitations. In the embodiments of the present disclosure, the virtual character is also three-dimensional, so it can be referred to as a "three-dimensional virtual character".

In different game applications, operations performed by user accounts to control the virtual characters may also vary. For example, in a shooting game application, a user account can control a virtual character to perform operations such as hitting, shooting, throwing virtual items, running, jumping, and casting skills.

Of course, in addition to the game application, other types of applications can also present virtual characters to users and provide corresponding functions for the virtual characters, for example, an Augmented Reality (AR) application, a social application, an interactive entertainment application, and any suitable applications without any limitations. In addition, for different applications, the forms of the virtual characters provided therefrom may also vary, and the corresponding functions may also vary. This can be pre-configured according to actual needs.

Figure 1:
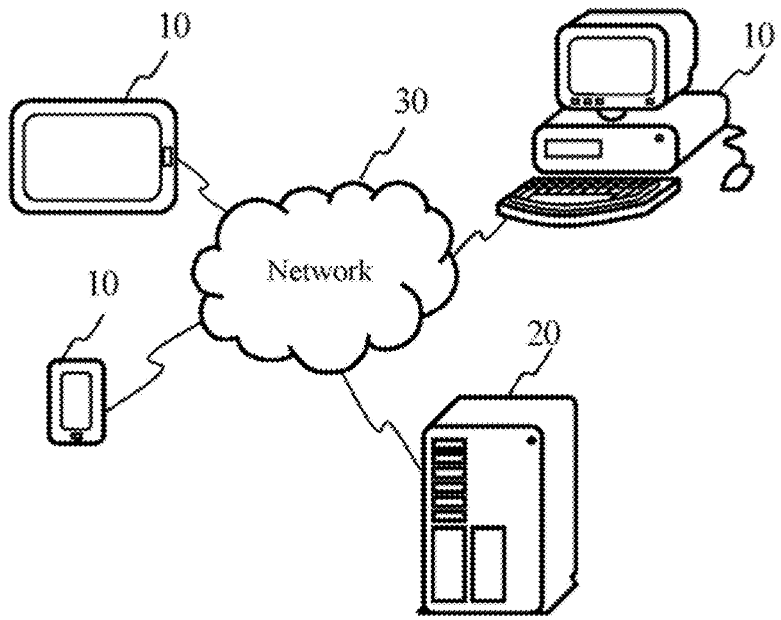
FIG. 1 is a schematic diagram of an implementation environment provided in a solution according to an embodiment of the present disclosure.

FIG. 1 shows a schematic diagram of a solution implementation environment according to one embodiment of the present disclosure. The solution implementation environment may include: a terminal 10 and a server 20.

The terminal 10 may be an electronic device such as a mobile phone, a tablet computer, a game console, a multimedia playback device, a personal computer (PC), a vehicle-mounted terminal, and a smart TV. The terminal 10 may be installed with a client of a target application. The target application can refer to applications that can provide a three-dimensional virtual environment, such as a game application, a simulation application, and an entertainment application. Exemplarily, the game application that can provide a three-dimensional (3D) virtual environment include but is not limited to: corresponding applications such as a 3D action game (3D ACT), a 3D shooting game, and a 3D multiplayer online battle arena (MOBA).

The server 20 is configured to provide a background service for the client of the target application installed in the terminal 10. For example, the server 20 may be a background server of the above target application. The server 20 may be one server, a server cluster including a plurality of servers, or a cloud computing service center.

The terminal 10 communicates with the server 20 by using a network 30. The network 30 may be a wired network, or may be a wireless network.

Figure 2:
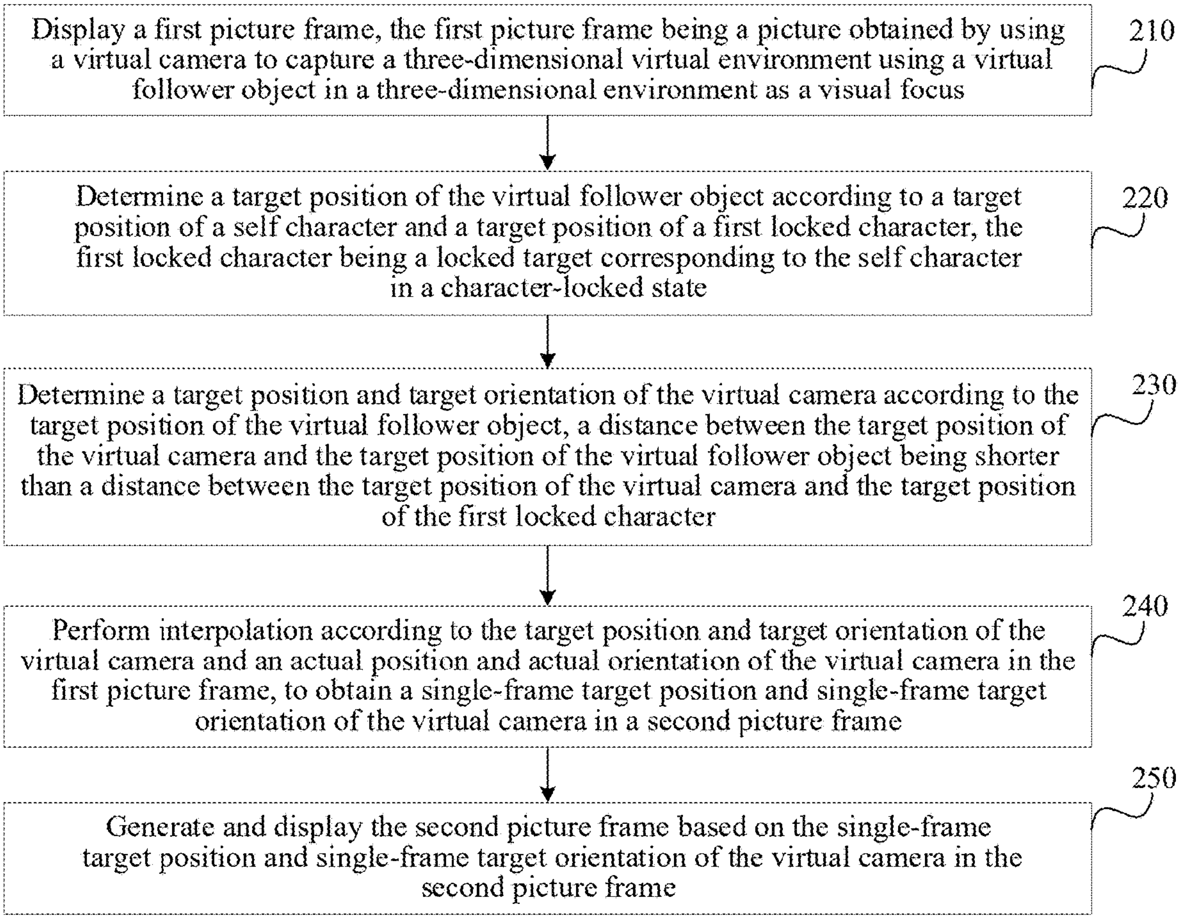
FIG. 2 is a flowchart of a picture display method according to an embodiment of the present disclosure.

FIG. 2 shows a flowchart of a picture display method according to an embodiment of the present disclosure. An executive member of each step of this method can be the terminal 10 in the solution implementation environment shown in FIG. 1, and the executive member of each step can be the client of the target application installed and run in the terminal 10. For ease of description, in the following method embodiment, the "client" serving as the executive member of each step is taken as an example for explanation. The method may include the following several steps (210 to 250):

Step 210: Display a first picture frame, the first picture frame being a picture obtained by using a virtual camera to capture the three-dimensional virtual environment using a virtual follower object in a three-dimensional virtual environment as a visual focus.

When presenting a content in the three-dimensional virtual environment to a user, the client will display one picture frame after another. The picture frames are images obtained by using the virtual camera to capture the three-dimensional virtual environment. For example, the first picture frame mentioned above may refer to an image obtained by using the virtual camera to capture the three-dimensional virtual environment at a current moment. The three-dimensional virtual environment may include virtual characters, for example, a virtual character (referred to as "self character" in the embodiments of the present disclosure) controlled by the user, and virtual characters controlled by other users or systems (for example, Artificial Intelligence (AI)). In some embodiments, the three-dimensional virtual environment may also include some other virtual items, for example, virtual houses, virtual vehicles, and/or virtual trees, without any limitations. In an embodiment of the present disclosure, a virtual camera technology can be used to generate picture frames. That is, the client observes the three-dimensional virtual environment with the virtual camera serving as an observation viewing angle and captures the three-dimensional virtual environment in real time (or at a fixed interval) to obtain picture frames. Contents of the picture frames change as the position of the virtual camera changes.

In an embodiment of the present disclosure, the virtual camera takes a virtual follower object in a three-dimensional virtual environment as a visual focus. The virtual follower object is an invisible object. For example, the virtual follower object is not a virtual character or virtual item, nor does it have a shape. It can be regarded as a point in the three-dimensional virtual environment. The virtual follower object in the three-dimensional virtual environment may undergo corresponding position changes as the position of the self character (optionally including other virtual characters) changes. The virtual camera may follow the virtual follower object to move (for example, position and orientation), thus capturing things around the virtual follower object in the three-dimensional virtual environment and presenting them to the user in picture frames.

Step 220: Determine a target position of a virtual follower object according to a target position of a self character and a target position of a first locked character. The first locked character is a locked target corresponding to the self character in a character-locked state.

The character-locked state refers to a state where the self character takes another virtual character as a locked target. The another virtual character may be a virtual character controlled by another user or the system. In the character-locked state, the position and orientation of the virtual camera need to change as the positions of the self character and the locked character change, so that the self character and the locked character can be contained in the picture frames captured by the virtual camera as far as possible, and the user can watch the self character and the locked character in the picture frames.

In an embodiment of the present disclosure, because the visual focus of the virtual camera is the virtual follower object, the position and orientation of the virtual camera will change as the position of the virtual follower object changes, while the position of the virtual follower object will change as the positions of the self character and the locked character change. The locked character is the locked target corresponding to the self character. In some embodiments, the locked character will be marked and displayed, and operations corresponding to the self character will be applied to the locked character. In some embodiments, the first locked character mentioned above can be any one or more of other virtual characters locked by the self character.

In some embodiments, the locked target of the self character serving as the first locked character is take as an example. An update process of the virtual camera in the character-locked state is explained. Step 220 can also include the following exemplary substeps:

1: Determine a first target position of the virtual follower object on a target straight line by taking the target position of the self character as a follow target. The target straight line is perpendicular to a connecting line between the target position of the self character and the target position of the first locked character.

In the character-locked state, on the one hand, the virtual follower object still needs to take the self character as the follow target and move with the movement of the self character. On the other hand, in order to present the currently locked first locked character in the picture frames, the target position of the virtual follower object also needs to consider the target position of the first locked character.

In an embodiment of the present disclosure, the target position can be understood as a planned position, referring to a desired position a position expected to move to. For example, the target position of the self character refers to a position desired by the self character or to which the self character expects to move (for example, a next frame corresponding to the first picture frame), and the target position of the first locked character refers to a position desired by the first locked character or to which the first locked character expects to move. The target position of the self character can be determined according to a control operation performed by the user on the self character. The target position of the first locked character can be determined according to a control operation performed by the system or another user on the first locked character.

Figure 3:
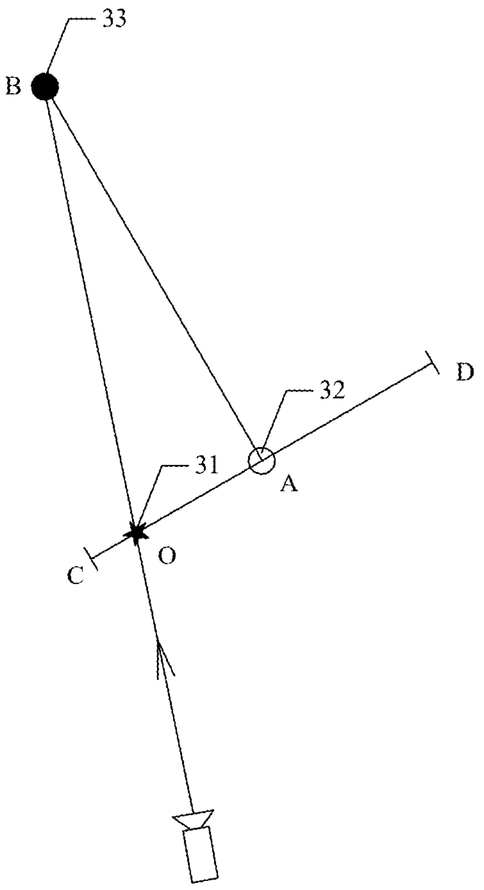
FIG. 3 is a schematic diagram of determining a first target position of a virtual follower object according to one embodiment of the present disclosure.

As shown in FIG. 3, a schematic diagram of determining a first target position of a virtual follower object 31 is exemplarily shown. A target position of a self character 32 is represented by point A in FIG. 3, and a target position of a first locked character 33 is represented by point B in FIG. 3. A target straight line CD is perpendicular to a straight line AB. The first target position of the virtual follower object 31 is determined on the target straight line CD and is represented by point O in FIG. 3. In FIG. 3, the target straight line CD is perpendicular to the straight line AB and passes through point A, that is, the target straight line is perpendicular to a connecting line between the target position (point A) of the self character 32 and the target position (point B) of the first locked character 33, and the target straight line passes through the target position (point A) of the self character 32. In some other embodiments, the target straight line CD may also be a straight line perpendicular to the straight line AB, but not passing through point A.

2: Determine the first target position of the virtual follower object as the target position of the virtual follower object when the first target position of the virtual follower object satisfies a condition.

3: Adjust the first target position of the virtual follower object when the first target position of the virtual follower object does not satisfy the condition, to obtain the target position of the virtual follower object.

In an embodiment of the present disclosure, after the first target position of the virtual follower object is determined, it is necessary to determine whether the first target position satisfies the condition. If the condition is satisfied, the first target position is determined as the target position of the virtual follower object. In addition, if the condition is not satisfied, it is necessary to adjust the first target position, to obtain the target position of the virtual follower object, and the target position obtained by adjustment satisfies the above condition. The setting of the condition is to ensure that the target position of the virtual follower object is at a relatively appropriate position. When the virtual camera takes the virtual follower object as the visual focus for capturing, the self character and the first locked character can be both included in a picture, and the positions of the self character and the first locked character do not overlap, thereby improving the display effect of a picture.

In some embodiments, the above condition includes: an offset distance of the first target position of the virtual follower object from the target position of the self character is less than or equal to a maximum offset. The first target position of the virtual follower object is adjusted based on the maximum offset when the offset distance of the first target position of the virtual follower object from the target position of the self character is greater than the maximum offset, to obtain the target position of the virtual follower object. An offset distance of the target position of the virtual follower object from the target position of the self character is less than or equal to the maximum offset. In some embodiments, the maximum offset may be a value greater than 0. In some embodiments, the maximum offset may be a fixed value or a value dynamically determined based on the position of the virtual camera. For example, as shown in FIG. 3, there is a hypothesis that a length of segment CA is the maximum offset. If a length of segment OA is greater than the length of segment CA, point C is determined as the target position of the virtual follower object 31. If the length of segment OA is less than or equal to the length of segment CA, point O is determined as the target position of the virtual follower object 31. In the above manner, such a phenomenon can be avoided: the virtual follower object is too far away from the self character, resulting in the self character not included in the picture frames captured by the virtual camera, thereby further improving the camera motion reasonability of the virtual camera.

In some embodiments, the above condition further includes: an offset distance of the first target position of the virtual follower object from the target position of the self character is greater than a minimum offset amount. The first target position of the virtual follower object is adjusted based on the minimum offset amount when the offset distance of the first target position of the virtual follower object from the target position of the self character is less than or equal to the minimum offset amount, to obtain the target position of the virtual follower object. The offset distance of the target position of the virtual follower object from the target position of the self character is greater than the minimum offset amount. In some embodiments, a value of the minimum offset amount can be 0 or a value greater than 0 without any limitations. In addition, the minimum offset amount is less than the maximum offset mentioned above. In some embodiments, the minimum offset amount may be a fixed value or a value dynamically determined based on the position of the virtual camera. For example, as shown in FIG. 3, if point O and point A overlap, point O is moved a certain distance along a direction of point C to obtain the target position of the virtual follower object 31. If point O and point A do not overlap, point O is determined as the target position of the virtual follower object 31. In the above manner, such a phenomenon can be avoided: the virtual follower object is on the connecting line between the self character and the first locked character, resulting in that the first locked character in the picture frame captured by the virtual camera is blocked by the self character, thereby further improving the camera motion reasonability of the virtual camera.

Figure 4:
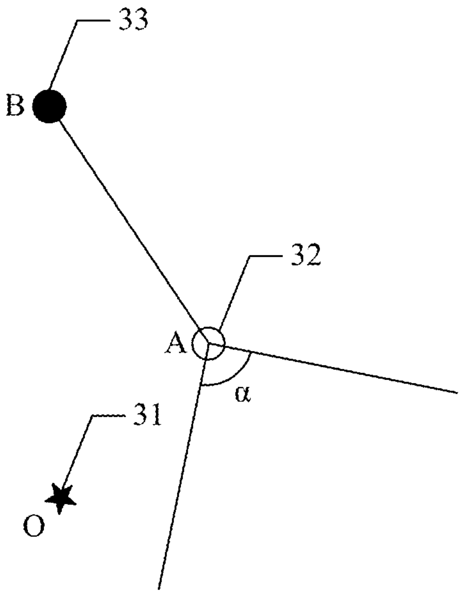
FIG. 4 is a schematic diagram of a backside angle region of a self character according to one embodiment of the present disclosure.

In some embodiments, the above condition further includes: the first target position of the virtual follower object is located within a backside angle region of the self character. The first target position of the virtual follower object is adjusted based on the backside angle region of the self character when the first target position of the virtual follower object is located beyond the backside angle region of the self character, to obtain the target position of the virtual follower object. The target position of the virtual follower object is located within the backside angle region of the self character. The backside angle region of the self character refers to a backside angle region facing an opposite direction to the first locked character, taking a straight line passing through the target position of the self character and the target position of the first locked character as a central axis. In the present disclosure, there is no limitation on a size of the backside angle region, for example, it can be 90 degrees, 120 degrees, 150 degrees, 180 degrees, or any suitable degrees, which can be set according to actual needs. FIG. 4 exemplarily shows a schematic diagram of a backside angle region. The target position of the self character 32 is represented by point A in FIG. 4; the target position of the first locked character 33 is represented by point B in FIG. 4; and the backside angle region of the self character 32 is represented by angle $\alpha$. If the first target position O of the virtual follower object 31 is located beyond angle $\alpha$, point O is moved to an edge of angle $\alpha$ to obtain the target position of the virtual follower object 31. If the first target position O of the virtual follower object 31 is located within angle $\alpha$, point O is determined as the target position of the virtual follower object 31. In such manner, it may be ensured that the self character is closer to the virtual camera than the first locked character, so that the user can intuitively distinguish between the self character and the first locked character according to a foreshortening effect.

Figure 5:
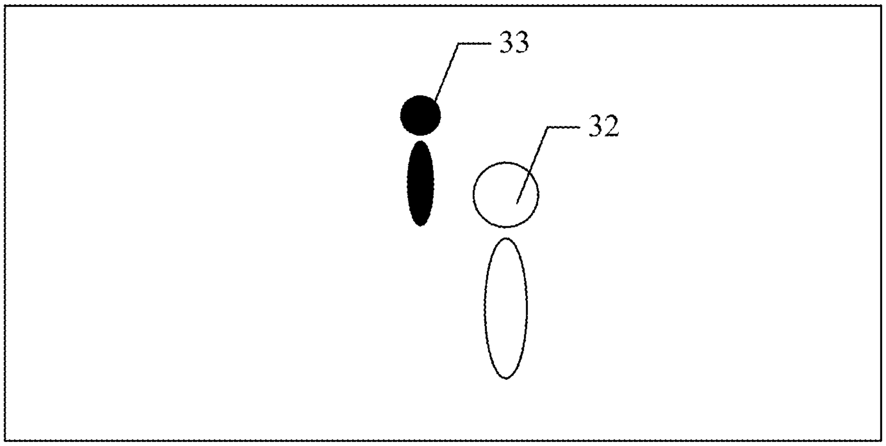
FIG. 5 is a schematic diagram of a picture captured by taking a virtual follower object as a visual focus according to an embodiment of the present disclosure.

FIG. 5 exemplarily shows a picture obtained by using the virtual camera taking the virtual follower object as the visual focus to capture the three-dimensional virtual environment, after the target position of the virtual follower object that satisfies the condition is determined using the above manner. From FIG. 5, it can be seen that on the one hand, both the self character 32 and the first locked character 33 are in the picture, and the self character 32 does not block the first locked character 33. On the other hand, the self character 32 is closer to the virtual camera than the first locked character 33. A size of the self character 32 is larger than a size of the first locked character 33, so that the user can more intuitively distinguish the two characters.

Step 230: Determine a target position and target orientation of the virtual camera according to the target position of the virtual follower object, a distance between the target position of the virtual camera and the target position of the virtual follower object being shorter than a distance between the target position of the virtual camera and the target position of the first locked character.

After the target position of the virtual follower object is determined, the target position and target orientation of the virtual camera can be determined according to the target position of the virtual follower object. In an embodiment of the present disclosure, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera.

In some embodiments, step 230 includes following exemplary substeps:

1: Determine, according to the target position of the virtual follower object, a rotating track where the virtual camera is located, where a plane where the rotating track is parallel to a reference plane of the three-dimensional virtual environment, and a central axis of the rotating track passes through the target position of the virtual follower object.

Figure 6:
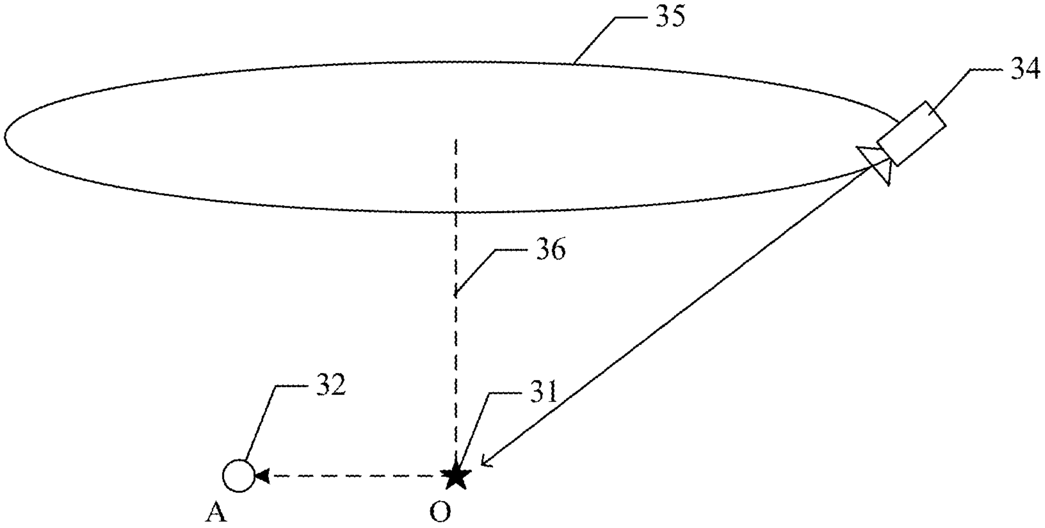
FIG. 6 is a schematic diagram of a rotating track where a virtual camera is located according to an embodiment of the present disclosure.

The rotating track in the present disclosure refers to a moving track of the virtual camera. The virtual camera can automatically follow the virtual object to move on the rotating track. The rotating track may be circular, elliptical, or in any suitable shape. As shown in FIG. 6, the target position of the virtual follower object 31 is represented by point O, and the target position of the self character 32 is represented by point A. The target position (namely, point O) of the virtual follower object 31 and the target position (namely, point A) of the self character 32 are located in a reference plane of the three-dimensional virtual environment. A plane where the rotating track 35 with the virtual camera 34 is located is parallel to the reference plane of the three-dimensional virtual environment, and a central axis 36 of the rotating track 35 passes through the target position (namely, point O) of the virtual follower object 31. The reference plane of the three-dimensional virtual environment may be a horizontal plane (for example, a ground plane) of the three-dimensional virtual environment. The virtual object in the three-dimensional virtual environment is on this reference plane, and the plane where the rotating track 35 with the virtual camera 34 is located is also on the reference plane, so that things in the three-dimensional virtual environment can be captured at a certain overhead perspective.

2: Determine the target position and target orientation of the virtual camera on the rotating track according to the target position of the virtual follower object and the target position of the first locked character.

The target position of the virtual camera refers to a position theoretically desired by the virtual camera or to which the virtual camera theoretically expects to move. The target orientation of the virtual camera refers to an orientation theoretically desired or expected by the virtual camera. A single-frame target position of the virtual camera below refers to a position actually desired by the virtual camera or to which the virtual camera actually expects to move, which is used for transitioning the virtual camera from a current position to the target position. A single-frame target orientation of the virtual camera below refers to an actual or expected orientation of the virtual camera, which is used for transitioning the virtual camera from a current orientation to the target orientation. If the target position of the first locked character and the target position of the virtual follower object are calibrated in the reference plane of the three-dimensional virtual environment, a projection point of the target position of the virtual camera in the reference plane of the three-dimensional virtual environment is located on a straight line where the target position of the first locked character and the target position of the virtual follower object are located, and the target position of the virtual follower object is located between the projection point mentioned above and the target position of the first locked character.

Figure 7:
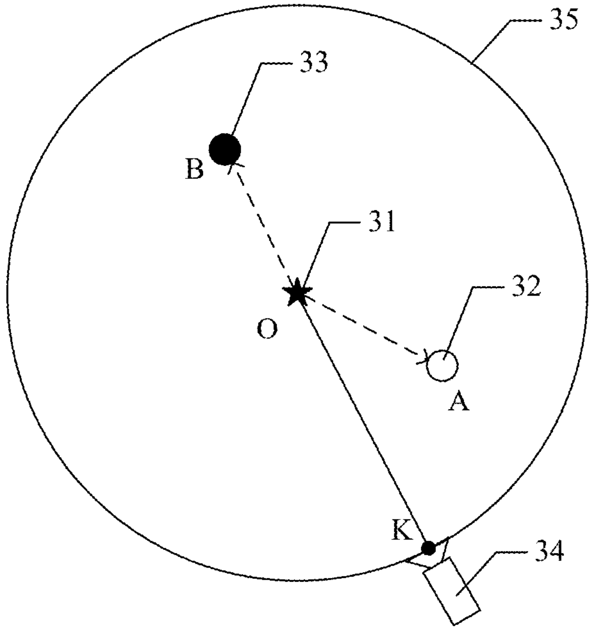
FIG. 7 is a schematic diagram of determining a target position and a target orientation of a virtual camera according to an embodiment of the present disclosure.

As shown in FIG. 7, the target position of the virtual follower object 31 is represented by point O; the target position of the self character 32 is represented by point A; and the target position of the first locked character 33 is represented by point B. On the rotating track 35, point K can be only determined. A projection point of point K in the reference plane of the three-dimensional virtual environment is denoted as point K' which is on straight line OB, and point O is located between point K' and point B. Point K is determined as the target position of the virtual camera 34, and line KO is determined as the target orientation of the virtual camera 34. Projection point K' of point K in the reference plane refers to an intersection of a straight line and the reference plane, and the straight line passes through point K and is perpendicular to the reference plane. The target position of the virtual camera is determined from the rotating track corresponding to the virtual camera based on the target position of the virtual follower object and the target position of the first locked character, so that the target position of the virtual camera is more reasonable, thereby further improving the camera motion reasonability of the virtual camera.

Step 240: Perform interpolation according to the target position and target orientation of the virtual camera and an actual position and actual orientation of the virtual camera in the first picture frame, to obtain a single-frame target position and single-frame target orientation of the virtual camera in a second picture frame.

After the target position of the virtual camera is determined, in combination with the actual position of the virtual camera in the first picture frame, the single-frame target position of the virtual camera in the second picture frame can be obtained by using a first interpolation algorithm. The goal of the first interpolation algorithm is to gradually (or smoothly) move the virtual camera to the target position.

Similarly, after the target orientation of the virtual camera is determined, in combination with the actual orientation of the virtual camera in the first picture frame, the single-frame target orientation of the virtual camera in the second picture frame can be obtained by using a second interpolation algorithm. The goal of the second interpolation algorithm is to gradually (or smoothly) move the virtual camera to the target orientation.

In some embodiments, the process of determining the single-frame target position of the virtual camera in the second picture frame includes: determining a first interpolation coefficient according to a first distance, the first distance being a distance between the first locked character and the self character, and the first interpolation coefficient being used for determining an adjustment amount of a position of the virtual camera; and determining the single-frame target position of the virtual camera in the second picture frame according to the target position of the virtual camera, the actual position of the virtual camera in the first picture frame, and the first interpolation coefficient.

Figure 8:
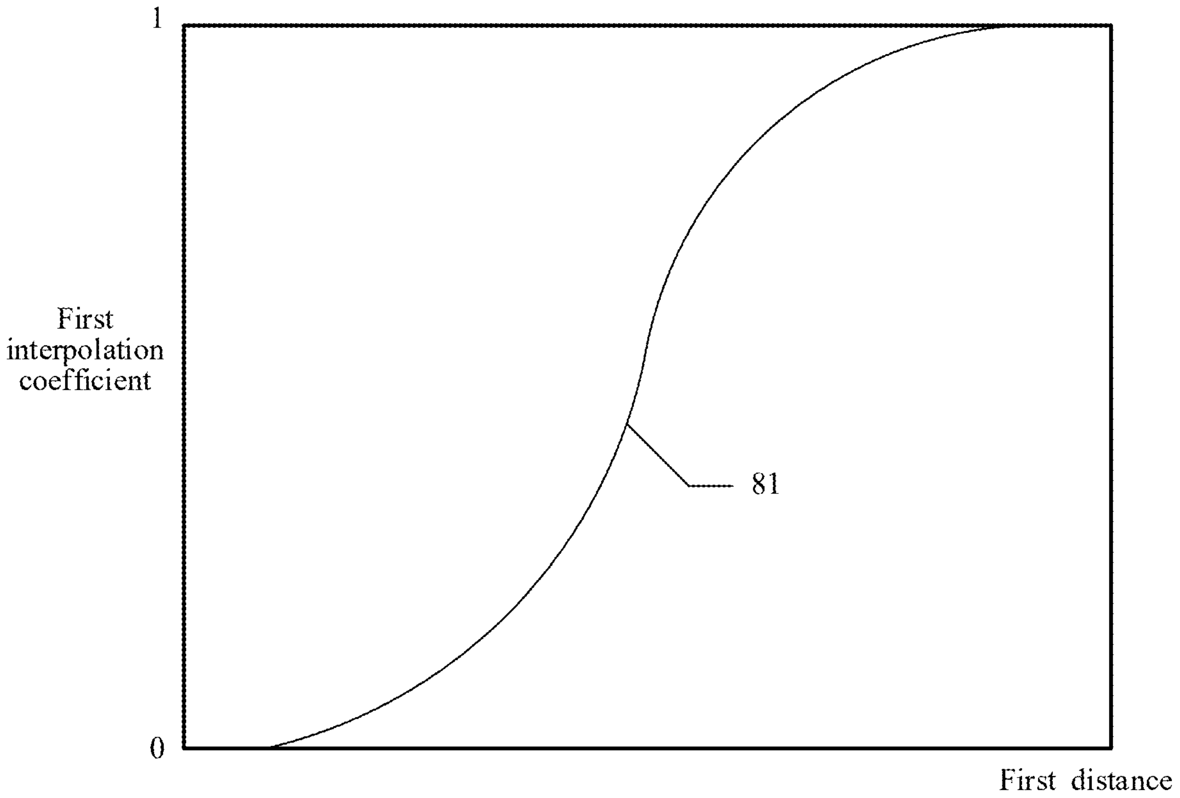
FIG. 8 is a schematic diagram of a relationship between a first distance and a first interpolation coefficient according to an embodiment of the present disclosure.

In some embodiments, the first interpolation coefficient and the first distance are in a positive correlation. For example, FIG. 8 shows a relationship curve 81 between the first distance and the first interpolation coefficient. The first interpolation coefficient can be determined according to the first distance based on the relationship curve 81 For example, the first interpolation coefficient can be a value in [0,1]. In some embodiments, a distance between the target position of the virtual camera and the actual position of the virtual camera in the first picture frame is calculated. The distance is multiplied by the first interpolation coefficient to obtain the adjustment amount of the position. The virtual camera is translated from the actual position of the virtual camera in the first picture frame to the target position of the virtual camera by the above adjustment amount of the position, thereby obtaining the single-frame target position of the virtual camera in the second picture frame. An interpolation coefficient related to the position of the virtual camera is determined in the above manner, so that when the distance between the self character and the locked character changes greatly, a displacement of the virtual camera also changes greatly. When the distance between the self character and the locked character changes little, the displacement of the virtual camera also changes little. Thus, it ensures that the self character and the locked character will not be beyond the visual field as far as possible, and contents in pictures change smoothly.

In some embodiments, the process of determining the single-frame target orientation of the virtual camera in the second picture frame includes: determining a second interpolation coefficient according to a second distance, the second distance being a distance between the first locked character and a central axis in a picture, and the second interpolation coefficient being used for determining an adjustment amount of an orientation of the virtual camera; and determining the single-frame target orientation of the virtual camera in the second picture frame according to the target orientation of the virtual camera, the actual orientation of the virtual camera in the first picture frame, and the second interpolation coefficient.

Figure 9:
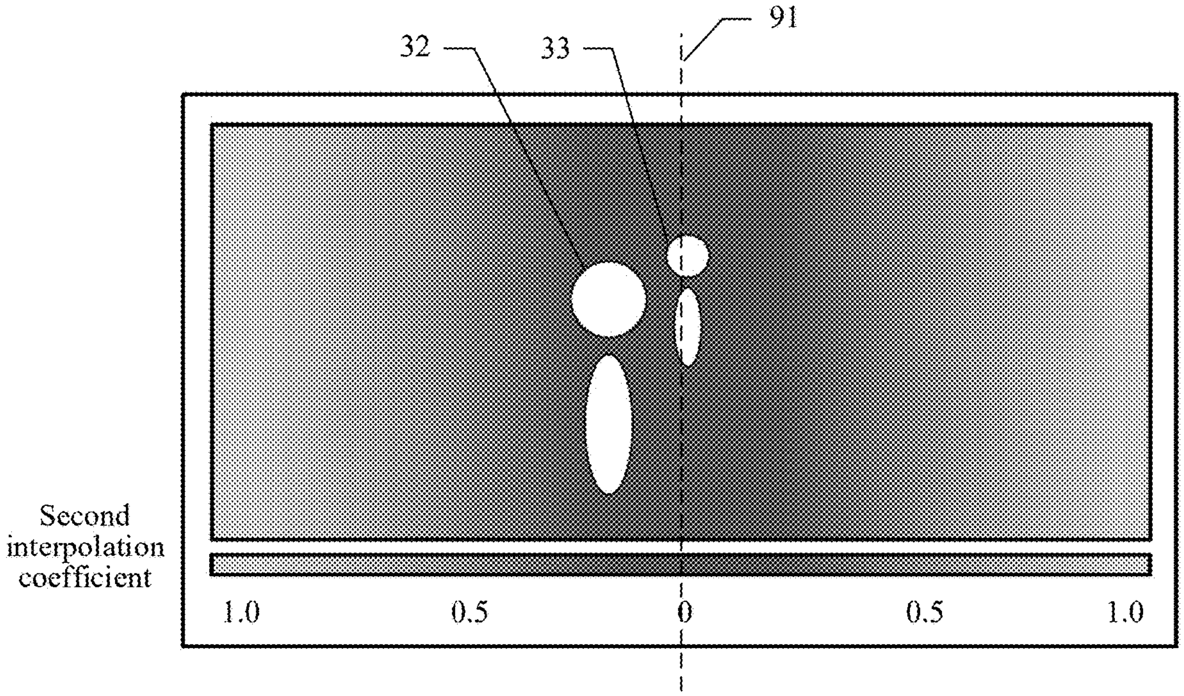
FIG. 9 is a schematic diagram of a relationship between a second distance and a second interpolation coefficient according to an embodiment of the present disclosure.
Figure 10:
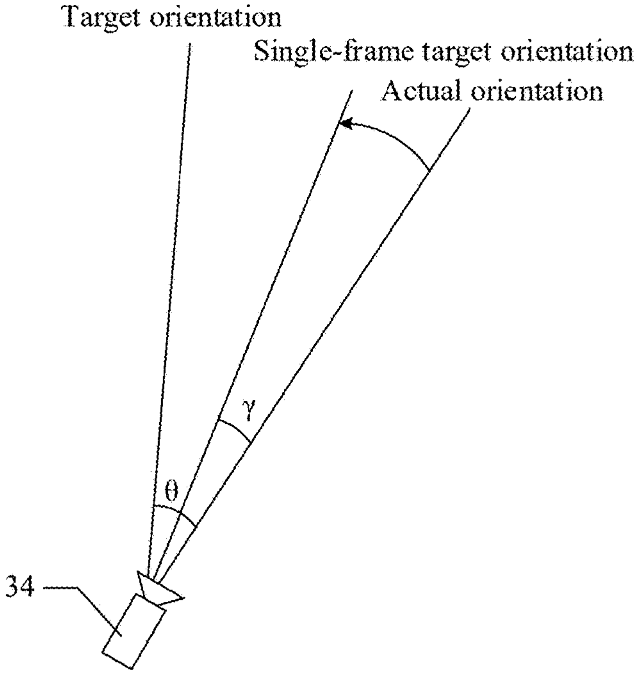
FIG. 10 is a schematic diagram of determining a single-frame target orientation of a virtual camera according to an embodiment of the present disclosure.

In some embodiments, the second interpolation coefficient and the second distance are in a positive correlation. For example, FIG. 9 shows a relationship diagram between the second distance and the second interpolation coefficient. In FIG. 9, the self character is represented by 32; the first locked character is represented by 33; and the central axis in the picture is represented by 91. For example, the second interpolation coefficient can be a value in [0,1]. The longer the distance between the first locked character 33 and the central axis 91 in the picture, the closer the second interpolation coefficient to 0. The longer the distance between the first locked character 33 and the central axis 91 in the picture, the closer the second interpolation coefficient to 1. In some embodiments, as shown in FIG. 10, an angle θ between the target orientation of the virtual camera 34 and the actual orientation of the virtual camera 34 in the first picture frame of the picture is calculated. The angle θ is multiplied by the second interpolation coefficient to obtain the adjustment amount y of the orientation. Then the actual orientation is deflected towards the target orientation by the above adjustment amount y of the orientation, to obtain the single-frame target orientation of the virtual camera 34 in the second picture frame. An interpolation coefficient related to the orientation of the virtual camera is determined in the above manner. When the locked character is close to the central axis in the picture, the orientation changes little. Even if the locked character has frequent and rapid movements the virtual camera will not shake significantly. When the locked character is away from the central axis in the picture, the orientation changes significantly. Even if the locked character sprints beyond the visual field range fast, the virtual camera can respond timely, to ensure that the locked character is not deviated from the visual field range.

Step 250: Generate and display the second picture frame based on the single-frame target position and single-frame target orientation of the virtual camera in the second picture frame.

After the single-frame target position and single-frame target orientation of the virtual camera in the second picture frame are determined, the client can control the virtual camera to be placed according to the above single-frame target position and single-frame target orientation, take pictures of the three-dimensional virtual environment by taking the virtual follower object in the three-dimensional virtual environment as the visual focus, to obtain the second picture frame, and display the second picture frame.

In some embodiments, the second picture frame may be a next picture frame of the first picture frame. The second picture frame can be displayed after the first picture frame is displayed. For example, if the first picture frame is a picture frame at current time, the second picture frame is a picture frame at next time of the current time. The single-frame target position mentioned above is a true position of the virtual camera at the next time, and the single-frame target orientation mentioned above is a true orientation of the virtual camera at the next time.

In addition, the embodiments of the present disclosure take a process of switching from the first picture frame to the second picture frame as an example to explain a picture switching process in the character-locked state. It is understood that a process of switching between any two picture frames in the character-locked state can be achieved according to the process of switching from the first picture frame to the second picture frame described above.

As such, a virtual follower object in a three-dimensional virtual environment is used as a visual focus of a virtual camera. In a character-locked state, position information of the virtual follower object is determined based on position information of a self character and position information of a locked state, and a position and orientation of the virtual camera are updated based on the position information of the virtual follower object. During determination of the position information of the virtual follower object, both the position information of the self character and the position information of the locked character are taken into account, which avoids the locked character from being blocked by the self character, so that the determined position information of the virtual follower object is more reasonable and accurate, thus ensuring that in a picture captured by the virtual camera taking the virtual follower object as the visual focus, the self character and the locked character can be presented to a user in a more reasonable and clearer way, which improves the camera motion reasonability of the virtual camera in the character-locked state, and thus improves the display effect of a picture.

In addition, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera in the character-locked state.

Figure 11:
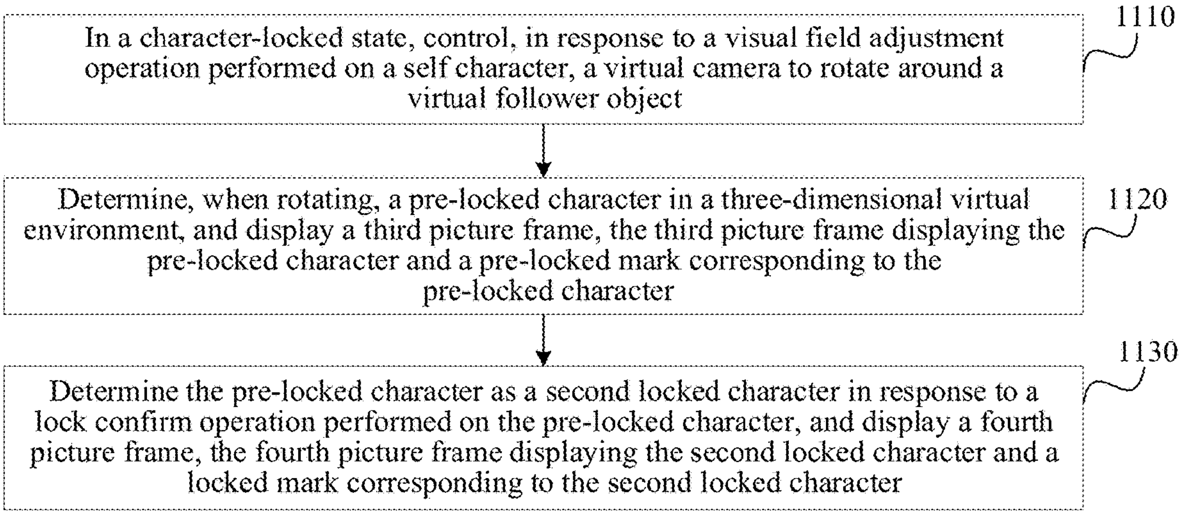
FIG. 11 is a flowchart of switching a locked character in a character-locked state according to an embodiment of the present disclosure.

In some embodiments, as shown in FIG. 11, this embodiment of the present disclosure can also support switching the locked character in the character-locked state. The process may include following several steps (1110 to 1130):

Step 1110: Control, in the character-locked state in response to a visual field adjustment operation performed on the self character, the virtual camera to rotate around the virtual follower object.

In the character-locked state, there is a hypothesis that the first locked character is currently locked. The user can control the virtual camera to rotate around the virtual follower object on the rotating track of the virtual camera by performing the visual field adjustment operation performed on the self character, so as to switch the locked character. The rotating track of the virtual camera can refer to the explanation of the embodiments above, and will not be repeated here. The visual field adjustment operation is used for adjusting an observation visual field of the virtual camera. For example, a rotating direction and rotating speed of the virtual camera can be determined according to visual field adjustment operation. For example, the visual field adjustment operation is a sliding operation of a finger of the user in a screen (a non-key region). The rotating direction of the virtual camera can be determined according to a direction of the sliding operation, and the rotating speed of the virtual camera can be determined according to a sliding speed or a sliding distance of the sliding operation.

In some embodiments, in the character-locked state, in response to the visual field adjustment operation performed on the self character, the client performs switching from the character-locked state to a non-character-locked state. In the non-character-locked state, the virtual camera is controlled to rotate around the virtual follower object according to the visual field adjustment operation.

In some embodiments, the character-locked state and non-character-locked state have corresponding virtual cameras. For ease of description, the virtual camera used in the character-locked state is referred to as a first virtual camera, and the virtual camera used in the non-character-locked state is referred to as a second virtual camera. In the character-locked state, the first virtual camera is in a working state, and the second virtual camera is in a non-working state. The client can update the position and orientation of the first virtual camera according to the method flow described in the embodiment in FIG. 2 above. In the character-locked state, in response to the visual field adjustment operation performed on the self character, the client switches the character-locked state to the non-character-locked state, and controls the currently used virtual camera to be switched from the first virtual camera to the second virtual camera. According to the visual field adjustment operation, the second virtual camera is controlled to rotate around the virtual follower object. In some embodiments, Sizes and positions of the rotating tracks of the first virtual camera and the second virtual camera are the same relative to the reference plane, thereby ensuring seamless switching between the first virtual camera and the second virtual camera, so that the user will not sense the camera switching process from pictures, and the switching efficiency for virtual cameras and the user experience are improved.

Step 1120: Determine, in the rotating process, a pre-locked character in a three-dimensional virtual environment, and display a third picture frame, the third picture frame displaying the pre-locked character and a pre-locked mark corresponding to the pre-locked character.

During the rotation of the virtual camera, the first locked character is no longer locked, and the client is in the non-character-locked state. The non-character-locked state at this time can also be referred to as the pre-locked state. In the pre-locked state, the client determines the pre-locked character in the three-dimensional virtual environment according to the positions of the various virtual characters in the three-dimensional virtual environment, as well as the position and orientation of the virtual camera. For example, the visual focus (namely, the virtual follower object) of the virtual camera is determined based on the position and orientation of the virtual camera, a virtual object closest to the visual focus is determined as the pre-locked character. The pre-locked character refers to a virtual character that is about to be locked, or a virtual character that may be possibly locked. At the same time, in the pre-locked state, if there is a pre-locked character, a pre-locked mark corresponding to the pre-locked character will be displayed in a picture frame displayed by the client to remind the user which virtual character is currently pre-locked.

Step 1130: Determine the pre-locked character as a second locked character in response to a lock confirmation operation performed on the pre-locked character, and display a fourth picture frame, the fourth picture frame displaying the second locked character and a locked mark corresponding to the second locked character.

The lock confirmation operation refers to a triggering operation performed by the user to determine the pre-locked character as a locked character. Still for example, the above visual field adjustment operation is the sliding operation of the finger of the user in the screen. If the finger of the user leaves the screen, the sliding operation is ended, and an operation that ends the sliding operation is determined as the lock confirmation operation. The client can determine the pre-locked character corresponding to the end of the sliding operation as a second locked character.

In some embodiments, after determining the pre-locked character as the second locked character, the client may also perform switching from the non-character-locked state (or, the pre-locked state) to the character-locked state. In the character-locked state, the position and orientation of the virtual camera will be updated according to the method flow described in the embodiment in FIG. 2 above.

In some embodiments, if the character-locked state and non-character-locked state have corresponding virtual cameras, when the client performs switching from the non-character-locked state (or the pre-locked state) to the character-locked state, the client will also control the currently used virtual camera to be switched from the second virtual camera to the first virtual camera, and then the position and orientation of the first virtual camera will be updated according to the method flow described in the embodiment in FIG. 2 above.

In addition, a locked mark is used for distinguishing a locked character from other non-locked characters. The locked mark can be different from the pre-locked mark, allowing the user to distinguish whether a virtual character is a pre-locked character or a locked character based on the different marks.

Figure 12:
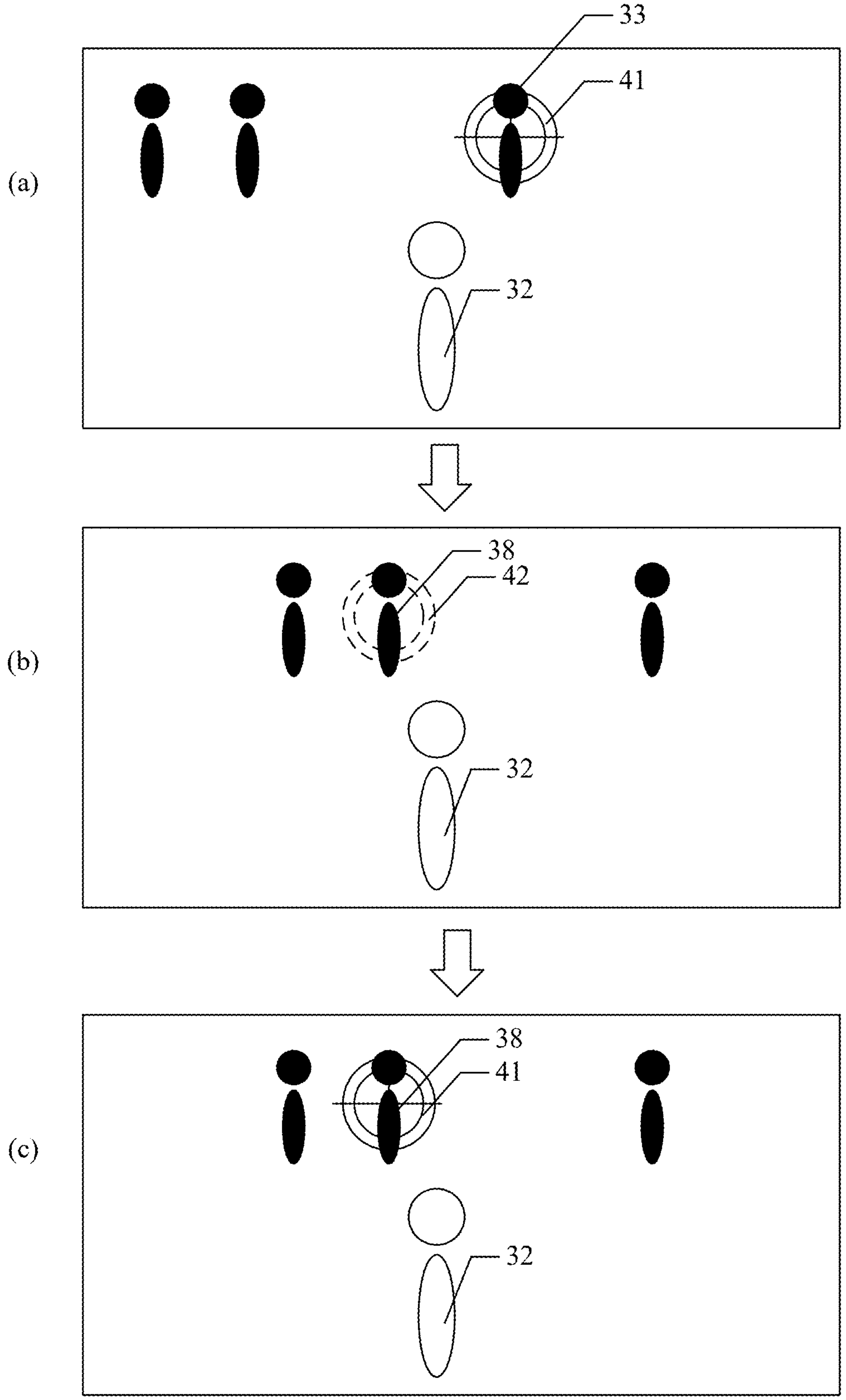
FIG. 12 is a schematic diagram of determining and marking a pre-locked character according to an embodiment of the present disclosure.

Exemplarily, as shown in FIG. 12, FIG. 12(*a*) shows the character-locked state. The self character 32 locks the first locked character 33, and a locked mark 41 corresponding to the first locked character 33 is displayed in the picture frame. At this time, the user can trigger adjustment on the visual field of the self character 32 by performing the sliding operation on the screen. During the sliding operation, the client controls the virtual camera to rotate around the virtual follower object according to information, such as a direction and displacement, of the sliding operation. In the rotating process, the client may predict a pre-locked character in the three-dimensional virtual environment. As shown in FIG. 12(*b*), after he pre-locked character 38 is determined, the client may display a pre-locked mark 42 corresponding to the pre-locked character 38 in the picture frame. The user can know based on the pre-locked mark 42 which virtual character is currently in the pre-locked state. If the current pre-locked character 38 meets user's expectation, the user can stop performing the sliding operation, for example, controlling the finger to leave the screen. At this time, the client will determine the pre-locked character 38 as the second locked character and display the locked mark 41 corresponding to the second locked character in the picture frame, as shown in FIG. 12(*c*).

In an embodiment of the present disclosure, in the character-locked state, the switching of the locked character is also achieved by supporting the adjustment of the visual field of the self character. In addition, in the switching process, the client automatically predicts the pre-locked character and displays the pre-locked mark corresponding to the pre-locked character, so that the user can intuitively and clearly watch which virtual character is currently in the pre-locked state, making it convenient for the user to switch the locked character accurately and efficiently.

In some embodiments, as shown in FIG. 13, an update process of the virtual camera in a non-character-locked state may include following several steps (1310 to 1350):

Step 1310: Update, in a non-character-locked state, the position of the virtual follower object in an interpolation manner by taking the self character as a follow target, to obtain a single-frame target position of the virtual follower object in a fifth picture frame.

In the non-character-locked state, the visual focus of the virtual camera is still the virtual follower object. At this time, there is no locked character, the position update of the virtual follower object only needs to consider changes of the position of the self character, without considering changes of the position of the locked character. In some embodiments, in the non-character-locked state, the single-frame target position of the virtual follower object is determined by using a third interpolation algorithm, and the goal of the third interpolation algorithm is to make the virtual follower object to smoothly follow the self character.

In some embodiments, in the non-character-locked state, a third interpolation coefficient is determined according to a third distance. The third distance refers to a distance between the self character and the virtual follower object. The third interpolation coefficient is used for determining an adjustment amount of the position of the virtual follower object. The third interpolation coefficient and the third distance are in a positive correlation. The single-frame target position of the virtual follower object in the fifth picture frame is determined according to the actual position of the self character in the first picture frame, the actual position of the virtual follower object in the first picture frame, and the third interpolation coefficient. Exemplarily, the third interpolation coefficient can also be a value in [0,1]. A distance between the actual position of the self character in the first picture frame and the actual position of the virtual follower object in the first picture frame. The distance is multiplied by the third interpolation coefficient to obtain the adjustment amount of the position, and then the actual position of the virtual follower object in the first picture frame is translated towards the self character by the above adjustment amount of the position, to obtain the single-frame target position of the virtual follower object in the fifth picture frame. The fifth picture frame may be a next picture frame of the first picture frame. In the above manner, if the self character is farther from the virtual follower object, the virtual follower object has a higher follow speed. If the self character is closer to the virtual follower object, the virtual follower object has a lower follow speed. Due to the fact that the virtual follower object slowly follows the self character in the three-dimensional virtual environment, even if the self character has an irregular displacement or a significant misalignment from other virtual characters, the virtual camera may still translate smoothly, which improves the camera motion reasonability of the virtual camera in the non-character-locked state.

Step 1320: Determine a single-frame target position of the virtual camera in the fifth picture frame according to the single-frame target position of the virtual follower object in the fifth picture frame.

After the single-frame target position of the virtual follower object in the fifth picture frame is obtained, the single-frame target position of the virtual camera in the fifth picture frame can be determined according to an existing positional relationship between the virtual camera and the virtual follower object.

Exemplarily, as shown in FIG. 14, in the non-character-locked state, the self character 32 IS used as a follow target, the position of the virtual follower object 31 is updated in an interpolation manner, to obtain the single-frame target position of the virtual follower object 31. Then, the single-frame target position of the virtual camera 34 is further determined according to the single-frame target position of the virtual follower object 31.

Step 1330: Determine, when no visual field adjustment operation performed on the self character is obtained, the actual orientation of the virtual camera in the first picture frame as a single-frame target orientation of the virtual camera in the fifth picture frame.

In the non-character-locked state, if the user does not perform the visual field adjustment operation on the self character to adjust the orientation of the visual field, the client maintains the orientation of the virtual camera in the previous frame.

Step 1340: Adjust, when a visual field adjustment operation performed on the self character is obtained, the actual orientation of the virtual camera in the first picture frame according to the visual field adjustment operation, to obtain a single-frame target orientation of the virtual camera in the fifth picture frame.

In the non-character-locked state, if the user performs the visual field adjustment operation on the self character to adjust the orientation of the visual field, the client needs to update the orientation of the virtual camera. In some embodiments, the client updates the orientation of the virtual camera according to the visual field adjustment operation. For example, the visual field adjustment operation is a sliding operation on the screen. The client may determine an adjustment direction and adjustment angle of the orientation of the virtual camera according to information such as a direction and a displacement of the sliding operation, and then determine a target orientation in the next frame in combination with the orientation in the previous frame.

Step 1350: Generate and display the fifth picture frame based on the single-frame target position and single-frame target orientation of the virtual camera in the fifth picture frame.

After the single-frame target position and single-frame target orientation of the virtual camera in the fifth picture frame are determined, the client can control the virtual camera to be placed according to the above single-frame target position and single-frame target orientation, take pictures of the three-dimensional virtual environment by taking the virtual follower object in the three-dimensional virtual environment as the visual focus, to obtain the fifth picture frame, and display the fifth picture frame.

In an embodiment of the present disclosure, the virtual follower object is also controlled to follow the self character to move smoothly in the non-character-locked state, and then the virtual camera takes pictures by taking the virtual follower object as the visual focus. Because the virtual follower object slowly follows the self character in the three-dimensional virtual environment, even if the self character has an irregular displacement or a significant misalignment from other virtual characters, the virtual camera may still translate smoothly to avoid dramatic shaking or the like of contents in the pictures, thereby improving the watching experience of the user.

The technical solution of the present disclosure will be described below with reference to FIG. 15.

Figure 15:
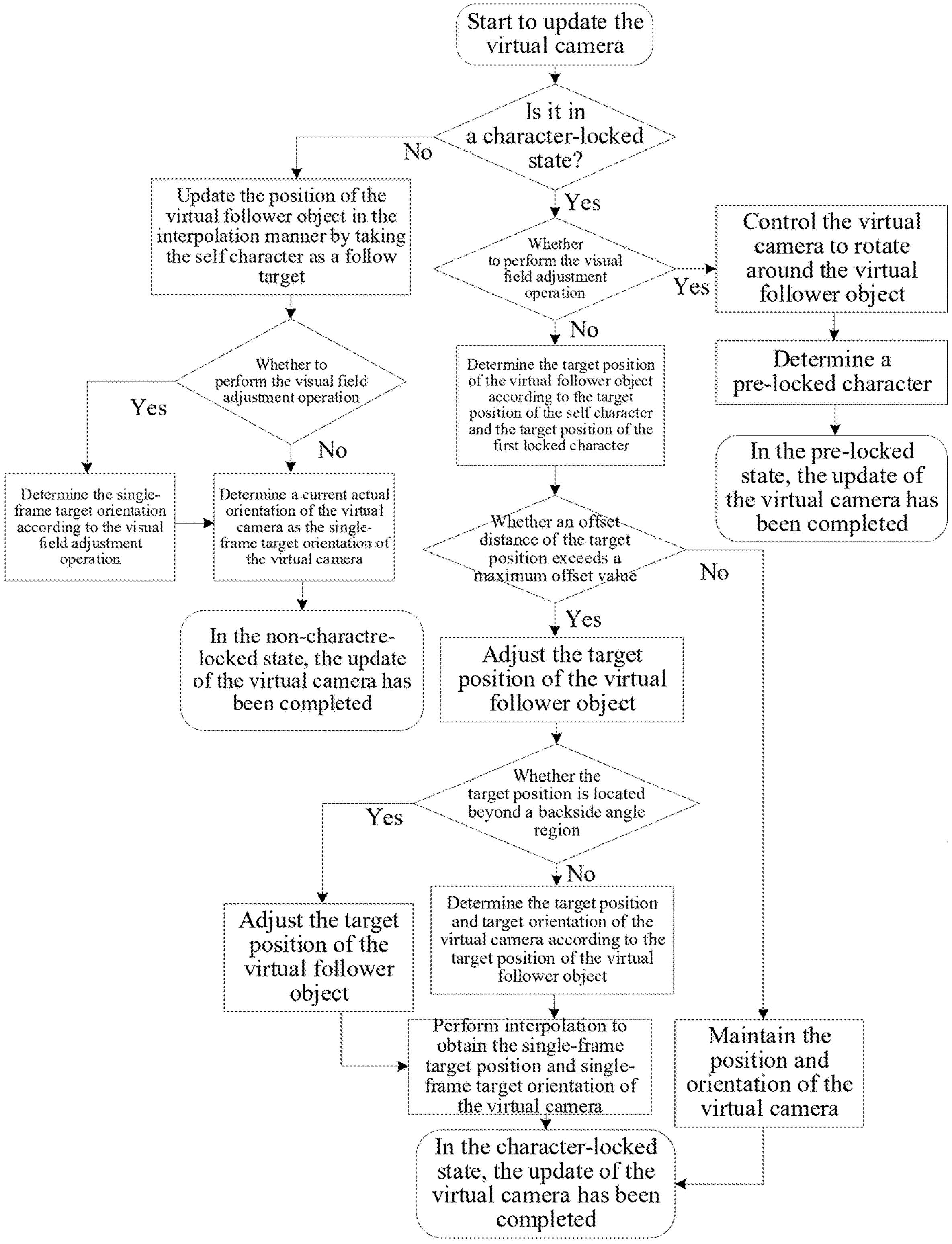
FIG. 15 is a flowchart of an update process of a virtual camera according to an embodiment of the present disclosure.

As shown in FIG. 15, after update of the virtual camera starts, the client first determines whether it is in a character-locked state. If it is in the character-locked state, the client further determines whether the user performs a visual field adjustment operation in the character-locked state, that is, whether the user performs a visual field adjustment operation in the character-locked state. If the user does not perform a visual field adjustment operation, the client determines a target position of a virtual follower object according to a target position of a self character and a target position of a first locked character. Then the client determines whether an offset distance between the target position of the virtual follower object and the target position of the self character exceeds a maximum offset. If the offset distance exceeds the maximum offset, the client adjusts the target position of the virtual follower object. If the offset distance does not exceed the maximum offset, the client maintains the position and orientation of the virtual camera. Further, the client determines whether the target position of the virtual follower object is beyond a backside angle region of the self character. If the target position is beyond the backside angle region, the client adjusts the target position of the virtual follower object. If the target position is located within the backside angle region, the client determines the target position and target orientation of the virtual camera according to the target position of the virtual follower object. The client then performs interpolation according to the target position and target orientation of the virtual camera and a current actual position and actual orientation of the virtual camera, to obtain a single-frame target position and single-frame target orientation of the virtual camera. In this way, the update of the virtual camera is completed in the character-locked state.

In the character-locked state, if the user performs a visual field adjustment operation, the client controls the virtual camera to rotate around the virtual follower object to determine a pre-locked character. In this way, the update of the virtual camera is completed in a pre-locked state.

In a non-character-locked state, the position of the virtual follower object is updated by interpolation by taking the self character as a follow target. Then, the client determines whether the user performs a visual field adjustment operation. If the user performs a visual field adjustment operation, the client determines a single-frame target orientation according to the visual field adjustment operation. If the user does not perform a visual field adjustment operation, the client determines a current actual orientation of the virtual camera as a single-frame target orientation. In this way, the update of the virtual camera is completed in the non-character-locked state.

During running of the client, the position and orientation of the virtual camera need to be updated at each frame. Then, the three-dimensional virtual environment is captured based on the updated position and orientation by taking the virtual follower object as the visual focus, to obtain picture frames displayed to the user.

Figure 16:
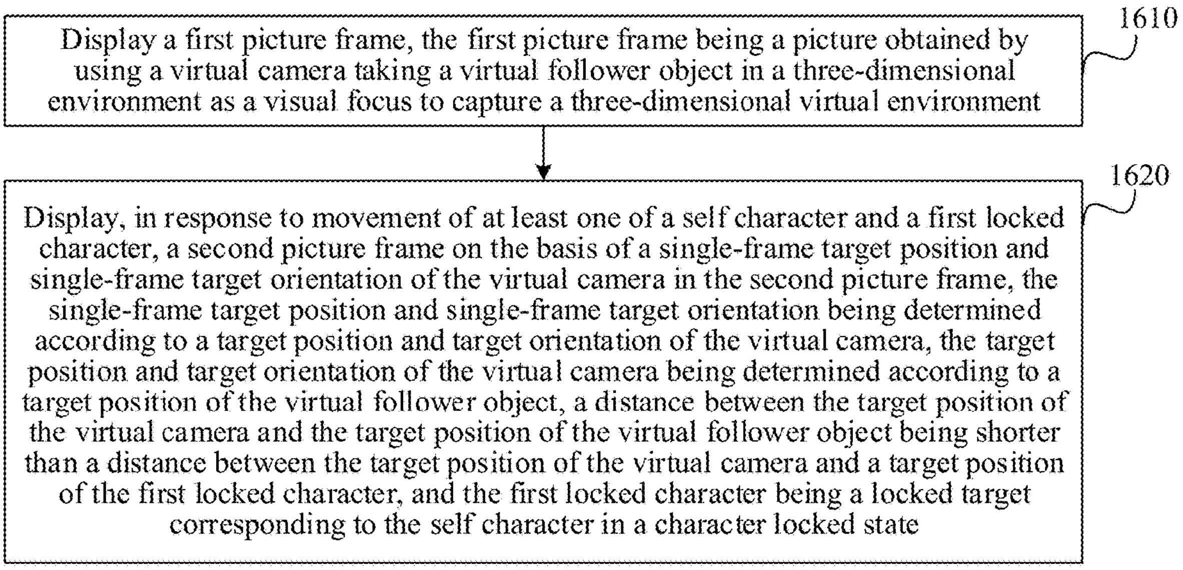
FIG. 16 is a flowchart of a picture display method according to another embodiment of the present disclosure.

FIG. 16 shows a flowchart of a picture display method according to another embodiment of the present disclosure. An executive member of each step of this method can be the terminal 10 in the solution implementation environment shown in FIG. 1, and the executive member of each step can be the client of the target application installed and run in the terminal 10. For ease of description, in the following method embodiment, the "client" serving as the executive member of each step is taken as an example for explanation. The method may include the following several steps (1610 to 1620):

Step 1610: Display a first picture frame, the first picture frame being a picture obtained by using a virtual camera to capture the three-dimensional virtual environment taking a virtual follower object in a three-dimensional virtual environment as a visual focus.

Step 1620: Display the second picture frame based on a single-frame target position and single-frame target orientation of the virtual camera in the second picture frame in response to movement of at least one of a self character and a first locked character, the single-frame target position and the single-frame target orientation being determined according to a target position and target orientation of the virtual camera, the target position and target orientation of the virtual camera being determined according to a target position of the virtual follower object, a distance between the target position of the virtual camera and the target position of the virtual follower object being shorter than a distance between the target position of the virtual camera and a target position of the first locked character, and the first locked character being a locked target corresponding to the self character in a character-locked state.

In the character-locked state, because both the self character and the first locked character may move, the position and orientation of the virtual camera need to be adaptively adjusted according to changes of the positions of the self character and the first locked character, ensuring that the self character and the locked character are contained in picture frames captured by the virtual camera as far as possible.

In an exemplary embodiment, step 1620 may include following exemplary substeps:

1: Determine a target position of the self character and a target position of the first locked character in response to the movement of at least one of the self character and the first locked character.

2: Determine a target position of the virtual follower object according to the target position of the self character and the target position of the first locked character.

3: Determine a target position and target orientation of the virtual camera according to the target position of the virtual follower object.

4: Perform interpolation according to the target position and target orientation of the virtual camera and an actual position and actual orientation of the virtual camera in the first picture frame, to obtain a single-frame target position and single-frame target orientation of the virtual camera in a second picture frame.

5: Generate and display the second picture frame based on the single-frame target position and single-frame target orientation of the virtual camera in the second picture frame.

In some embodiments, this embodiment of the present disclosure can also support switching the locked character in the character-locked state. The method further includes:

controlling, in the character-locked state in response to a visual field adjustment operation performed on the self character, the virtual camera to rotate around the virtual follower object;

determining, in the rotating process, a pre-locked character in the three-dimensional virtual environment, and displaying a third picture frame, the third picture frame displaying the pre-locked character and a pre-locked mark corresponding to the pre-locked character; and determining the pre-locked character as a second locked character in response to a lock confirmation operation performed on the pre-locked character, and displaying a fourth picture frame, the fourth picture frame displaying the second locked character and a locked mark corresponding to the second locked character.

In some embodiments, an update process of the virtual camera in a non-character-locked state may include following steps:

updating, in a non-character-locked state, the position of the virtual follower object by taking the self character as a follow target, to obtain a single-frame target position of the virtual follower object in a fifth picture frame; and displaying the fifth picture frame based on the single-frame target position and single-frame target orientation of the virtual camera in the fifth picture frame, the single-frame target position of the virtual camera in the fifth picture frame being determined according to the single-frame target position of the virtual follower object in the fifth picture frame, and the single-frame target orientation of the virtual camera in the fifth picture frame being determined according to an actual orientation of the virtual camera in the first picture frame.

For undescribed details in this embodiment, please refer to the explanation of those details in other method embodiments described above.

In summary, according to the technical solution provided in this embodiment of the present disclosure, a virtual follower object in a three-dimensional virtual environment is used as a visual focus of a virtual camera. In a character-locked state, position information of the virtual follower object is determined based on position information of a self character and position information of a locked state, and a position and orientation of the virtual camera are updated based on the position information of the virtual follower object. During determination of the position information of the virtual follower object, both the position information of the self character and the position information of the locked character are taken into account, which avoids the locked character from being blocked by the self character, so that the determined position information of the virtual follower object is more reasonable and accurate, thus ensuring that in a picture captured by the virtual camera taking the virtual follower object as the visual focus, the camera motion reasonability of the virtual camera in the character-locked state is improved, and the self character and the locked character can be presented to a user in a more reasonable and clearer way, which improves the display effect of a picture.

In addition, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera in the character-locked state.

The following describes an apparatus embodiment of the present disclosure, which can be configured to implement the method embodiment of the present disclosure. For details not disclosed in the apparatus embodiment of the present disclosure, refer to the method embodiment of the present disclosure.

Figure 17:
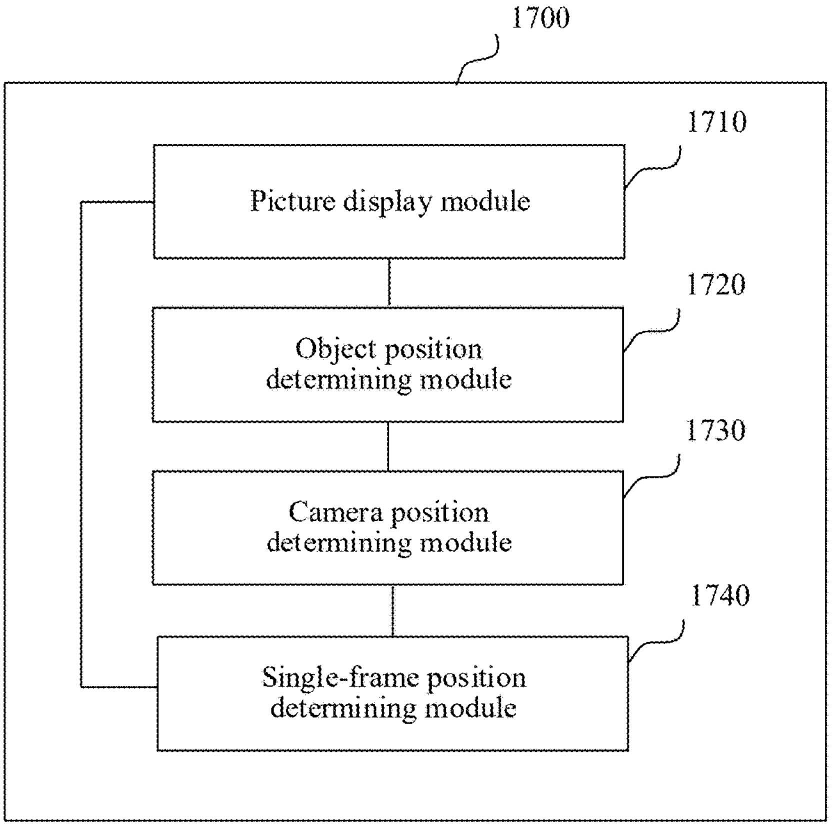
FIG. 17 is a block diagram of a picture display apparatus according to an embodiment of the present disclosure.

FIG. 17 shows a block diagram of a picture display apparatus according to an embodiment of the present disclosure. The apparatus has a function of performing the foregoing method examples. The function may be implemented by hardware or may be implemented by hardware executing corresponding software. The apparatus may be a terminal described above or arranged in a terminal. As shown in FIG. 17, the apparatus 1700 may include: a picture display module 1710, an object position determining module 1720, a camera position determining module 1730, and a single-frame position determining module 1740.

The picture display module 1710 is configured to display a first picture frame, the first picture frame being a picture obtained by using a virtual camera to capture the three-dimensional virtual environment taking a virtual follower object in a three-dimensional virtual environment as a visual focus.

The object position determining module 1720 is configured to determine a target position of the virtual follower object according to a target position of a self character and a target position of a first locked character, the first locked character being a locked target corresponding to the self character in a character-locked state.

The camera position determining module 1730 is configured to determine a target position and target orientation of the virtual camera according to the target position of the virtual follower object, a distance between the target position of the virtual camera and the target position of the virtual follower object being shorter than a distance between the target position of the virtual camera and the target position of the first locked character.

The single-frame position determining module 1740 is configured to perform interpolation according to the target position and target orientation of the virtual camera and an actual position and actual orientation of the virtual camera in the first picture frame, to obtain a single-frame target position and single-frame target orientation of the virtual camera in a second picture frame.

The picture display module 1710 is further configured to generate and display the second picture frame based on the single-frame target position and single-frame target orientation of the virtual camera in the second picture frame.

In some embodiments, the single-frame position determining module 1740 is configured to:

determine, according to the target position of the virtual follower object, a rotating track where the virtual camera is located, where a plane where the rotating track is parallel to a reference plane of the three-dimensional virtual environment, and a central axis of the rotating track passes through the target position of the virtual follower object; and determine the target position and target orientation of the virtual camera on the rotating track according to the target position of the virtual follower object and the target position of the first locked character.

In some embodiments, the single-frame position determining module 1740 is further configured to:

determine a first interpolation coefficient according to a first distance, the first distance being a distance between the first locked character and the self character, and the first interpolation coefficient being used for determining an adjustment amount of a position of the virtual camera;

determining the single-frame target position of the virtual camera in the second picture frame according to the target position of the virtual camera, the actual position of the virtual camera in the first picture frame, and the first interpolation coefficient;

determine a second interpolation coefficient according to a second distance, the second distance being a distance between the first locked character and a central axis in a picture, and the second interpolation coefficient being used for determining an adjustment amount of an orientation of the virtual camera; and determine the single-frame target orientation of the virtual camera in the second picture frame according to the target orientation of the virtual camera, the actual orientation of the virtual camera in the first picture frame, and the second interpolation coefficient.

In some embodiments, the first interpolation coefficient and the first distance are in a positive correlation, and the second interpolation coefficient and the second distance are in a positive correlation.

In some embodiments, the object position determining module 1720 is configured to:

determine, in the character-locked state, a first target position of the virtual follower object on a target straight line by taking the target position of the self character as a follow target, the target straight line being perpendicular to a connecting line between the target position of the self character and the target position of the first locked character;

determine the first target position of the virtual follower object as the target position of the virtual follower object when the first target position of the virtual follower object satisfies a condition; and adjust the first target position of the virtual follower object when the first target position of the virtual follower object does not satisfy the condition, to obtain the target position of the virtual follower object.

In some embodiments, the condition includes: an offset distance of the first target position of the virtual follower object from the target position of the self character is less than or equal to a maximum offset. The object position determining module 1720 is further configured to: adjust the first target position of the virtual follower object based on the maximum offset when the offset distance of the first target position of the virtual follower object from the target position of the self character is greater than the maximum offset, to obtain the target position of the virtual follower object; and an offset distance of the target position of the virtual follower object from the target position of the self character is less than or equal to the maximum offset.

In some embodiments, the condition includes: the first target position of the virtual follower object is located within a backside angle region of the self character. The object position determining module 1720 is further configured to: adjust the first target position of the virtual follower object based on the backside angle region of the self character when the first target position of the virtual follower object is located beyond the backside angle region of the self character, to obtain the target position of the virtual follower object; and the target position of the virtual follower object is located within the backside angle region of the self character.

In some embodiments, the camera position determining module 1730 is configured to control, in the character-locked state in response to a visual field adjustment operation performed on the self character, the virtual camera to rotate around the virtual follower object.

The picture display module 1710 is configured to: determine, in the rotating process, a pre-locked character in the three-dimensional virtual environment, and display a third picture frame, the third picture frame displaying the pre-locked character and a pre-locked mark corresponding to the pre-locked character.

The picture display module 1710 is further configured to: determine the pre-locked character as a second locked character in response to a lock confirmation operation performed on the pre-locked character, and display a fourth picture frame, the fourth picture frame displaying the second locked character and a locked mark corresponding to the second locked character.

In some embodiments, the object position determining module 1720 is further configured to update, in a non-character-locked state, the position of the virtual follower object in an interpolation manner by taking the self character as a follow target, to obtain a single-frame target position of the virtual follower object in a fifth picture frame.

The single-frame position determining module 1740 is further configured to: determine a single-frame target position of the virtual camera in the fifth picture frame according to the single-frame target position of the virtual follower object in the fifth picture frame; determine, when no visual field adjustment operation performed on the self character is obtained, the actual orientation of the virtual camera in the first picture frame as a single-frame target orientation of the virtual camera in the fifth picture frame; and adjust, when a visual field adjustment operation performed on the self character is obtained, the actual orientation of the virtual camera in the first picture frame according to the visual field adjustment operation, to obtain a single-frame target orientation of the virtual camera in the fifth picture frame.

The picture display module 1710 is further configured to generate and display the fifth picture frame based on the single-frame target position and single-frame target orientation of the virtual camera in the fifth picture frame.

In some embodiments, the object position determining module 1720 is further configured to:

- determine a third interpolation coefficient in the non-character-locked state according to a third distance, the third distance being a distance between the self character and the virtual follower object, and the third interpolation coefficient being used for determining an adjustment amount of a position of the virtual follower object, where the third interpolation coefficient and the third distance are in a positive correlation; and
- determine the single-frame target position of the virtual follower object in the fifth picture frame according to an actual position of the self character in the first picture frame, an actual position of the virtual follower object in the first picture frame, and the third interpolation coefficient.

As such, a virtual follower object in a three-dimensional virtual environment is used as a visual focus of a virtual camera. In a character-locked state, position information of the virtual follower object is determined based on position information of a self character and position information of a locked state, and a position and orientation of the virtual camera are updated based on the position information of the virtual follower object. During determination of the position information of the virtual follower object, both the position information of the self character and the position information of the locked character are taken into account, which avoids the locked character from being blocked by the self character, so that the determined position information of the virtual follower object is more reasonable and accurate, thus ensuring that in a picture captured by the virtual camera taking the virtual follower object as the visual focus, the self character and the locked character can be presented to a user in a more reasonable and clearer way, which improves the camera motion reasonability of the virtual camera in the character-locked state, and thus improves the display effect of a picture.

In addition, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera in the character-locked state.

Another exemplary embodiment of the present disclosure further provides a picture display apparatus. As shown in FIG. 17, the apparatus 1700 may include: a picture display module 1710.

The picture display module 1710 is configured to display a first picture frame, the first picture frame being a picture obtained by using a virtual camera to capture the three-dimensional virtual environment with a virtual follower object in a three-dimensional virtual environment as a visual focus.

The picture display module 1710 is further configured to display the second picture frame based on a single-frame target position and single-frame target orientation of the virtual camera in the second picture frame in response to movement of at least one of a self character and a first locked character, the single-frame target position and the single-frame target orientation being determined according to a target position and target orientation of the virtual camera, the target position and target orientation of the virtual camera being determined according to a target position of the virtual follower object, a distance between the target position of the virtual camera and the target position of the virtual follower object being shorter than a distance between the target position of the virtual camera and a target position of the first locked character, and the first locked character being a locked target corresponding to the self character in a character-locked state.

In some embodiments, as shown in FIG. 17, the apparatus 1700 may further include: an object position determining module 1720, a camera position determining module 1730, and a single-frame position determining module 1740.

The object position determining module 1720 is configured to: determine a target position of the self character and the target position of the first locked character in response to the movement of at least one of the self character and the first locked character; and determine the target position of the virtual follower object according to the target position of the self character and the target position of the first locked character.

The camera position determining module 1730 is configured to determine a target position and target orientation of the virtual camera according to the target position of the virtual follower object.

The single-frame position determining module 1740 is configured to perform interpolation according to the target position and target orientation of the virtual camera and an actual position and actual orientation of the virtual camera in the first picture frame, to obtain a single-frame target position and single-frame target orientation of the virtual camera in a second picture frame.

The picture display module 1710 is further configured to generate and display the second picture frame based on the single-frame target position and single-frame target orientation of the virtual camera in the second picture frame.

In some embodiments, the camera position determining module 1730 is further configured to control, in the character-locked state in response to a visual field adjustment operation performed on the self character, the virtual camera to rotate around the virtual follower object.

The picture display module 1710 is further configured to: determine, in the rotating process, a pre-locked character in the three-dimensional virtual environment, and display a third picture frame, the third picture frame displaying the pre-locked character and a pre-locked mark corresponding to the pre-locked character.

The picture display module 1710 is further configured to: determine the pre-locked character as a second locked character in response to a lock confirmation operation performed on the pre-locked character, and display a fourth picture frame, the fourth picture frame displaying the second locked character and a locked mark corresponding to the second locked character.

In some embodiments, the object position determining module 1720 is further configured to update, in a non-character-locked state, the position of the virtual follower object by taking the self character as a follow target, to obtain a single-frame target position of the virtual follower object in a fifth picture frame.

The picture display module 1710 is further configured to display the fifth picture frame based on the single-frame target position and single-frame target orientation of the virtual camera in the fifth picture frame, the single-frame target position of the virtual camera in the fifth picture frame being determined according to the single-frame target position of the virtual follower object in the fifth picture frame, and the single-frame target orientation of the virtual camera in the fifth picture frame being determined according to an actual orientation of the virtual camera in the first picture frame.

As such, a virtual follower object in a three-dimensional virtual environment is used as a visual focus of a virtual camera. In a character-locked state, position information of the virtual follower object is determined based on position information of a self character and position information of a locked state, and a position and orientation of the virtual camera are updated based on the position information of the virtual follower object. During determination of the position information of the virtual follower object, both the position information of the self character and the position information of the locked character are taken into account, which avoids the locked character from being blocked by the self character, so that the determined position information of the virtual follower object is more reasonable and accurate, thus ensuring that in a picture captured by the virtual camera taking the virtual follower object as the visual focus, the self character and the locked character can be presented to a user in a more reasonable and clearer way, which improves the camera motion reasonability of the virtual camera in the character-locked state, and thus improves the display effect of a picture.

In addition, the distance between the target position of the virtual camera and the target position of the virtual follower object is kept being shorter than the distance between the target position of the virtual camera and the target position of the first locked character, so that the virtual follower object is closer to the virtual camera than the first locked character within a visual field range of the virtual camera, thereby avoiding the first locked character from blocking the visual field of the virtual camera and further improving the camera motion reasonability of the virtual camera in the character-locked state.

It is noted that, When the apparatus provided in the foregoing embodiment implements its functions, only division of the foregoing function modules is used as an example for description. In practical applications, the functions may be allocated to and completed by different function modules according to requirements. That is, an internal structure of the device is divided into different function modules, to complete all or some of the functions described above. In addition, the apparatus and method embodiments provided in the above embodiments belong to the same idea, and specific implementation processes of the apparatus refer to the details in the method embodiments, and are not described here again.

Figure 18:
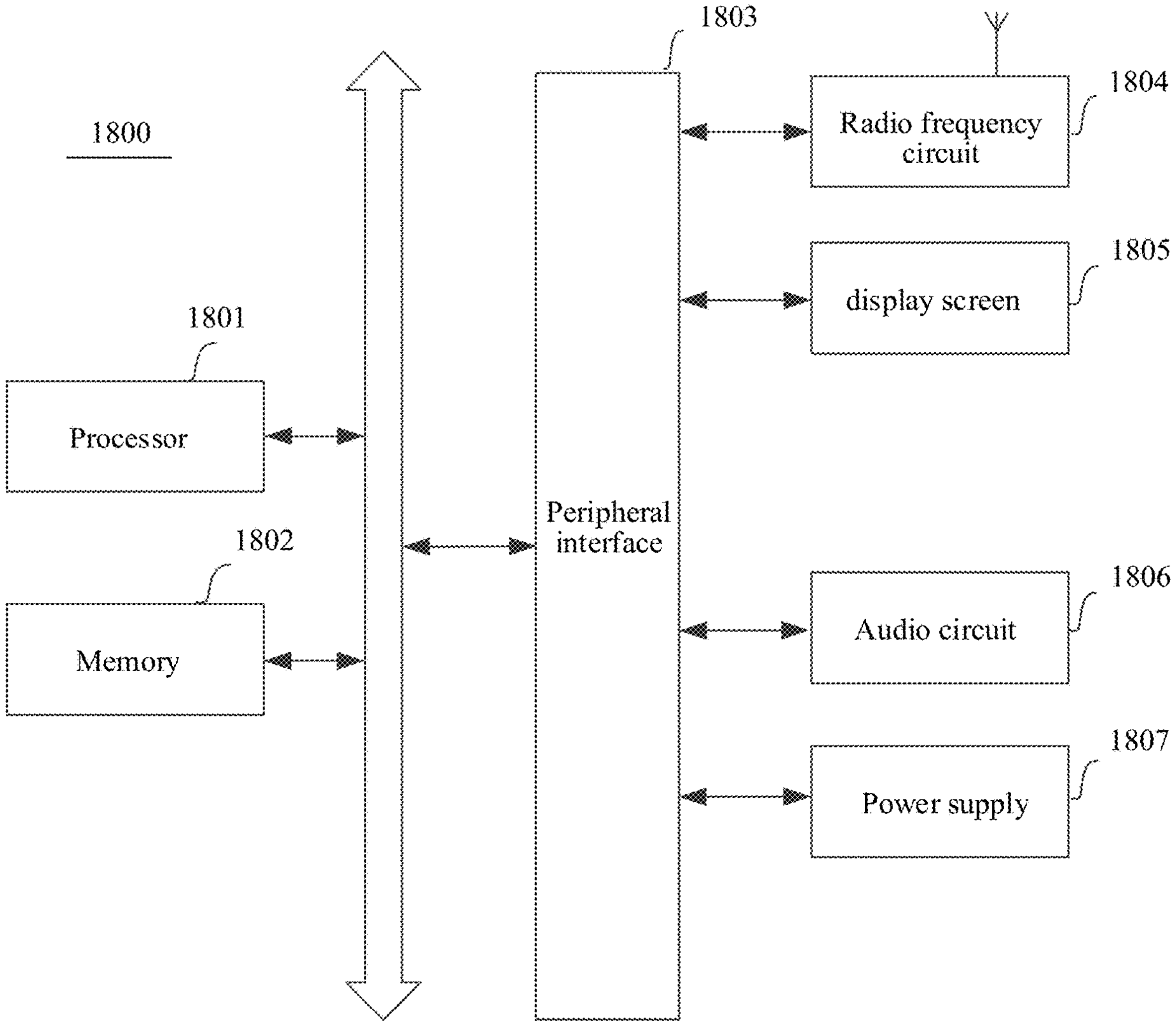
FIG. 18 is a structural block diagram of a terminal device according to an embodiment of the present disclosure.

FIG. 18 shows a structural block diagram of a terminal device 1800 according to one embodiment of the present disclosure. The terminal device 1800 may be the terminal device 10 in the implementation environment shown in FIG. 1, and is configured to implement the picture display methods provided in the above embodiments. Specifically:

the terminal device 1800 usually includes: a processor 1801 and a memory 1802.

The processor 1801 may include one or more processing cores, for example, a 4-core processor or an 8-core processor. The processor 1801 may be implemented in at least one hardware form of Digital Signal Processing (DSP), a Field-Programmable Gate Array (FPGA), a Programmable Logic Array (PLA). The processor 1801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to render and draw content that needs to be displayed on a display screen. In some embodiments, the processor 1801 may further include an artificial intelligence (AI) processor. The AI processor is configured to process computing operations related to machine learning.

The memory 1802 may include one or more computer-readable storage media. The computer-readable storage medium may be non-transient. The memory 1802 may further include a high-speed random access memory and a nonvolatile memory, for example, one or more disk storage devices or flash storage devices. In some embodiments, a non-transitory computer-readable storage medium in the memory 1802 is configured to store a computer program. The computer program is configured to be executed by one or more processors to implement the above picture display methods.

In some embodiments, the terminal device 1800 may further include: a peripheral interface 1803 and at least one peripheral. The processor 1801, the memory 1802, and the peripheral interface 1803 may be connected through a bus or a signal cable. Each peripheral may be connected to the peripheral interface 1803 through a bus, a signal cable, or a circuit board. Specifically, the peripheral includes: at least one of a radio frequency circuit 1804, a display screen 1805, an audio circuit 1806, and a power supply 1807.

A person skilled in the art may understand that the structure shown in FIG. 18 constitutes no limitation on the terminal device 1800, and may include more or fewer components than those shown in the figure, or some components may be combined, or a different component deployment may be used.

In an exemplary embodiment, a computer-readable storage medium is further provided. The storage medium stores a computer program. The computer program, when executed by a processor, implements the above picture display methods.

In some embodiments, the computer-readable storage medium may include: a Read-Only Memory (ROM), a Random Access Memory (RAM), a Solid State Drive (SSD), an optical disk, or the like. The RAM may include a resistance random access memory (ReRAM) and a dynamic random access memory (DRAM).

In an exemplary embodiment, a computer program product or a computer program is further provided. The computer program product or the computer program includes computer instructions stored in a computer-readable storage medium. A processor of a terminal device reads the computer instructions from the computer-readable storage medium and executes the computer instructions, causing the terminal device to implement the above picture display method.

It is noted that, Information (including but not limited to object device information, object personal information, and any suitable information), data (including but not limited to data for analysis, stored data, displayed data and any suitable data), and signals involved in the present disclosure are all authorized by an object or fully authorized by all parties, and the collection, use and processing of the relevant data need to comply with the relevant laws, regulations and standards of the relevant countries and regions. For example, the user account and the three-dimensional virtual environment involved in the present disclosure are all obtained under full authorization.

"A plurality of" mentioned herein means two or more. "And/or" describes an association relation for associated objects and represents that three relationships may exist. For example, A and/or B may represent: only A exists, both A and B exist, and only B exists. The character "/" usually indicates an "or" relation between associated objects. In addition, the step numbers described in the present disclosure merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

As used herein, the term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing descriptions are merely exemplary embodiments of the present disclosure, but are not intended to limit the claimed invention. Any modification, equivalent replacement, or improvement made within the spirit and principle of the present disclosure shall fall within the protection scope of the present disclosure.

What is claimed is:

1. A picture display method, performed by a terminal device comprising at least one memory and at least one processor, the method comprising:

displaying, on a display screen coupled to the at least one processor, a first picture frame that is obtained by using a virtual camera to capture a three-dimensional virtual environment using a virtual follower object in the three-dimensional virtual environment as a visual focus, the three-dimensional virtual environment being a gaming environment of a game executed by the at least one processor;

determining, by the at least one processor, a first target position of the virtual follower object on a target straight line by taking a target position of a self character as a follow target, the target straight line being perpendicular to a connecting line between the target position of the self character and a target position of a first locked character, the first locked character being a locked target corresponding to the self character in a character-locked state, the self character being a game character controlled by a user in the game;

in response to the first target position of the virtual follower object satisfying a condition, determining the first target position of the virtual follower object as a target position of the virtual follower object;

determining a target position and target orientation of the virtual camera according to the target position of the virtual follower object, a distance between the target position of the virtual camera and the target position of the virtual follower object being shorter than a distance between the target position of the virtual camera and the target position of the first locked character;

performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying on the display screen, the second picture frame based on the single-frame target position and single-frame target orientation of the virtual camera in the second picture frame, such that the second picture frame distinguishably presents the self character and the first locked character.

2. The method according to claim 1, wherein determining the target position and target orientation of the virtual camera according to the target position of the virtual follower object comprises:

determining, according to the target position of the virtual follower object, a rotating track where the virtual camera is located, wherein a plane where the rotating track is parallel to a reference plane of the three-dimensional virtual environment, and a central axis of the rotating track passes through the target position of the virtual follower object; and determining the target position and target orientation of the virtual camera on the rotating track according to the target position of the virtual follower object and the target position of the first locked character.

3. The method according to claim 1, wherein performing the interpolation according to the target position and target orientation of the virtual camera and the actual position and actual orientation of the virtual camera in the first picture frame, to obtain the single-frame target position and single-frame target orientation of the virtual camera in the second picture frame comprises:

determining a first interpolation coefficient according to a first distance, the first distance being a distance between the first locked character and the self character, and the first interpolation coefficient being used for determining an adjustment amount of a position of the virtual camera;

determining the single-frame target position of the virtual camera in the second picture frame according to the target position of the virtual camera, the actual position of the virtual camera in the first picture frame, and the first interpolation coefficient;

determining a second interpolation coefficient according to a second distance, the second distance being a distance between the first locked character and a central axis in a picture, and the second interpolation coefficient being used for determining an adjustment amount of an orientation of the virtual camera; and determining the single-frame target orientation of the virtual camera in the second picture frame according to the target orientation of the virtual camera, the actual orientation of the virtual camera in the first picture frame, and the second interpolation coefficient.

4. The method according to claim 3, wherein the first interpolation coefficient and the first distance are in a positive correlation, and the second interpolation coefficient and the second distance are in a positive correlation.

5. The method according to claim 1, further comprising adjusting the first target position of the virtual follower object when the first target position of the virtual follower object does not satisfy the condition, to obtain the target position of the virtual follower object.

6. The method according to claim 5, wherein the condition comprises: an offset distance of the first target position of the virtual follower object from the target position of the self character is less than or equal to a maximum offset;

adjusting the first target position of the virtual follower object when the first target position of the virtual follower object does not satisfy the condition, to obtain the target position of the virtual follower object comprises:

adjusting the first target position of the virtual follower object based on the maximum offset when the offset distance of the first target position of the virtual follower object from the target position of the self character is greater than the maximum offset, to obtain the target position of the virtual follower object; and an offset distance of the target position of the virtual follower object from the target position of the self character is less than or equal to the maximum offset.

7. The method according to claim 5, wherein the condition comprises: the first target position of the virtual follower object is located within a backside angle region of the self character;

adjusting the first target position of the virtual follower object when the first target position of the virtual follower object does not satisfy the condition, to obtain the target position of the virtual follower object comprises:

adjusting the first target position of the virtual follower object based on the backside angle region of the self character when the first target position of the virtual follower object is located beyond the backside angle region of the self character, to obtain the target position of the virtual follower object; and the target position of the virtual follower object is located within the backside angle region of the self character.

8. The method according to claim 1, further comprising:

controlling, in the character-locked state and in response to a visual field adjustment operation performed on the self character, the virtual camera to rotate around the virtual follower object;

determining, when rotating, a pre-locked character in the three-dimensional virtual environment, and displaying a third picture frame for displaying the pre-locked character and a pre-locked mark corresponding to the pre-locked character; and determining the pre-locked character as a second locked character in response to a lock confirmation operation performed on the pre-locked character, and displaying a fourth picture frame for displaying the second locked character and a locked mark corresponding to the second locked character.

9. The method according to claim 1, further comprising:

updating, in a non-character-locked state, the position of the virtual follower object in an interpolation manner by taking the self character as a follow target, to obtain a single-frame target position of the virtual follower object in a fifth picture frame;

determining a single-frame target position of the virtual camera in the fifth picture frame according to the single-frame target position of the virtual follower object in the fifth picture frame;

determining, when no visual field adjustment operation performed on the self character is obtained, the actual orientation of the virtual camera in the first picture frame as a single-frame target orientation of the virtual camera in the fifth picture frame;

adjusting, when a visual field adjustment operation performed on the self character is obtained, the actual orientation of the virtual camera in the first picture frame according to the visual field adjustment operation, to obtain a single-frame target orientation of the virtual camera in the fifth picture frame; and generating and displaying the fifth picture frame based on the single-frame target position and single-frame target orientation of the virtual camera in the fifth picture frame.

10. The method according to claim 9, wherein updating, in the non-character-locked state, the position of the virtual follower object in the interpolation manner by taking the self character as the follow target, to obtain the single-frame target position of the virtual follower object in the fifth picture frame comprises:

determining a third interpolation coefficient in the non-character-locked state according to a third distance, the third distance being a distance between the self character and the virtual follower object, and the third interpolation coefficient being used for determining an adjustment amount of a position of the virtual follower object, wherein the third interpolation coefficient and the third distance are in a positive correlation; and determining the single-frame target position of the virtual follower object in the fifth picture frame according to an actual position of the self character in the first picture frame, an actual position of the virtual follower object in the first picture frame, and the third interpolation coefficient.

11. The method according to claim 1, wherein the condition comprises at least one of:

an offset distance of the first target position of the virtual follower object from the target position of the self character being less than or equal to a maximum offset;

an offset distance of the first target position of the virtual follower object from the target position of the self character being greater than a minimum offset amount; or the first target position of the virtual follower object being located within a backside angle region of the self character.

12. A terminal device, comprising a processor and a memory, the memory storing a computer program, and the computer program being loaded and executed by the processor to implement:

displaying, on a display screen coupled to the processor, a first picture frame that is obtained by using a virtual camera to capture a three-dimensional virtual environment using a virtual follower object in the three-dimensional virtual environment as a visual focus, the three-dimensional virtual environment being a gaming environment of a game executed by the processor;

determining a first target position of the virtual follower object on a target straight line by taking a target position of a self character as a follow target, the target straight line being perpendicular to a connecting line between the target position of the self character and a target position of a first locked character, the first locked character being a locked target corresponding to the self character in a character-locked state, the self character being a game character controlled by a user in the game;

in response to the first target position of the virtual follower object satisfying a condition, determining the first target position of the virtual follower object as a target position of the virtual follower object;

determining a target position and target orientation of the virtual camera according to the target position of the virtual follower object, a distance between the target position of the virtual camera and the target position of the virtual follower object being shorter than a distance between the target position of the virtual camera and the target position of the first locked character;

performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying on the display screen, the second picture frame based on the single-frame target position and single-frame target orientation of the virtual camera in the second picture frame, such that the second picture frame distinguishably presents the self character and the first locked character.

13. The terminal device according to claim 12, wherein determining the target position and target orientation of the virtual camera according to the target position of the virtual follower object comprises:

determining, according to the target position of the virtual follower object, a rotating track where the virtual camera is located, wherein a plane where the rotating track is parallel to a reference plane of the three-dimensional virtual environment, and a central axis of the rotating track passes through the target position of the virtual follower object; and determining the target position and target orientation of the virtual camera on the rotating track according to the target position of the virtual follower object and the target position of the first locked character.

14. The terminal device according to claim 12, wherein performing the interpolation according to the target position and target orientation of the virtual camera and the actual position and actual orientation of the virtual camera in the first picture frame, to obtain the single-frame target position and single-frame target orientation of the virtual camera in the second picture frame comprises:

determining a first interpolation coefficient according to a first distance, the first distance being a distance between the first locked character and the self character, and the first interpolation coefficient being used for determining an adjustment amount of a position of the virtual camera;

determining the single-frame target position of the virtual camera in the second picture frame according to the target position of the virtual camera, the actual position of the virtual camera in the first picture frame, and the first interpolation coefficient;

determining a second interpolation coefficient according to a second distance, the second distance being a distance between the first locked character and a central axis in a picture, and the second interpolation coefficient being used for determining an adjustment amount of an orientation of the virtual camera; and determining the single-frame target orientation of the virtual camera in the second picture frame according to the target orientation of the virtual camera, the actual orientation of the virtual camera in the first picture frame, and the second interpolation coefficient.

15. The terminal device according to claim 14, wherein the first interpolation coefficient and the first distance are in a positive correlation, and the second interpolation coefficient and the second distance are in a positive correlation.

16. The terminal device according to claim 12, wherein the processor is further configured to implement:

determining a first target position of the virtual follower object on a target straight line by taking the target position of the self character as a follow target, the target straight line being perpendicular to a connecting line between the target position of the self character and the target position of the first locked character;

determining the first target position of the virtual follower object as the target position of the virtual follower object when the first target position of the virtual follower object satisfies a condition; and adjusting the first target position of the virtual follower object when the first target position of the virtual follower object does not satisfy the condition, to obtain the target position of the virtual follower object.

17. The terminal device according to claim 16, wherein the condition comprises: an offset distance of the first target position of the virtual follower object from the target position of the self character is less than or equal to a maximum offset;

adjusting the first target position of the virtual follower object when the first target position of the virtual follower object does not satisfy the condition, to obtain the target position of the virtual follower object comprises:

adjusting the first target position of the virtual follower object based on the maximum offset when the offset distance of the first target position of the virtual follower object from the target position of the self character is greater than the maximum offset, to obtain the target position of the virtual follower object; and an offset distance of the target position of the virtual follower object from the target position of the self character is less than or equal to the maximum offset.

18. The terminal device according to claim 16, wherein the condition comprises: the first target position of the virtual follower object is located within a backside angle region of the self character;

adjusting the first target position of the virtual follower object when the first target position of the virtual follower object does not satisfy the condition, to obtain the target position of the virtual follower object comprises:

adjusting the first target position of the virtual follower object based on the backside angle region of the self character when the first target position of the virtual follower object is located beyond the backside angle region of the self character, to obtain the target position of the virtual follower object; and the target position of the virtual follower object is located within the backside angle region of the self character.

19. The terminal device according to claim 12, wherein the processor is further configured to implement:

controlling, in the character-locked state and in response to a visual field adjustment operation performed on the self character, the virtual camera to rotate around the virtual follower object;

determining, when rotating, a pre-locked character in the three-dimensional virtual environment, and displaying a third picture frame for displaying the pre-locked character and a pre-locked mark corresponding to the pre-locked character; and determining the pre-locked character as a second locked character in response to a lock confirmation operation performed on the pre-locked character, and displaying a fourth picture frame for displaying the second locked character and a locked mark corresponding to the second locked character.

20. A non-transitory computer-readable storage medium, storing a computer program, the computer program being loaded and executed by a processor to implement:

displaying, on a display screen coupled to the processor, a first picture frame that is obtained by using a virtual camera to capture a three-dimensional virtual environment using a virtual follower object in the three-dimensional virtual environment as a visual focus, the three-dimensional virtual environment being a gaming environment of a game executed by the processor;

determining a first target position of the virtual follower object on a target straight line by taking a target position of a self character as a follow target, the target straight line being perpendicular to a connecting line between the target position of the self character and a target position of a first locked character, the first locked character being a locked target corresponding to the self character in a character-locked state, the self character being a game character controlled by a user in the game;

in response to the first target position of the virtual follower object satisfying a condition, determining the first target position of the virtual follower object as a target position of the virtual follower object;

determining a target position and target orientation of the virtual camera according to the target position of the virtual follower object, a distance between the target position of the virtual camera and the target position of the virtual follower object being shorter than a distance between the target position of the virtual camera and the target position of the first locked character;

performing interpolation according to the target position and target orientation of the virtual camera and an actual position and actual orientation of the virtual camera in the first picture frame, to obtain a single-frame target position and single-frame target orientation of the virtual camera in a second picture frame; and generating and displaying on the display screen, the second picture frame based on the single-frame target position and single-frame target orientation of the virtual camera in the second picture frame, such that the second picture frame distinguishably presents the self character and the first locked character.

* * * * *